US011259281B2

(12) United States Patent
Xu et al.

(10) Patent No.: US 11,259,281 B2
(45) Date of Patent: Feb. 22, 2022

(54) ELECTRONIC DEVICE IN WIRELESS COMMUNICATION SYSTEM, AND WIRELESS COMMUNICATION METHOD

(71) Applicant: Sony Corporation, Tokyo (JP)

(72) Inventors: Xiaodong Xu, Beijing (CN); Shiqing Zhang, Beijing (CN); Mengying Sun, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 16/636,034

(22) PCT Filed: May 16, 2018

(86) PCT No.: PCT/CN2018/087086
§ 371 (c)(1),
(2) Date: Feb. 3, 2020

(87) PCT Pub. No.: WO2019/029215
PCT Pub. Date: Feb. 14, 2019

(65) Prior Publication Data
US 2020/0213977 A1 Jul. 2, 2020

(30) Foreign Application Priority Data

Aug. 10, 2017 (CN) .......................... 201710680648.1

(51) Int. Cl.
*H04W 4/00* (2018.01)
*H04W 72/04* (2009.01)
(Continued)

(52) U.S. Cl.
CPC .......... *H04W 72/04* (2013.01); *H04B 17/318* (2015.01); *H04W 8/005* (2013.01)

(58) Field of Classification Search
CPC ....... H04W 72/04; H04W 8/005; H04W 8/00; H04W 4/00; H04W 8/14; H04W 76/10; H04B 17/318
(Continued)

(56) References Cited

U.S. PATENT DOCUMENTS 10,075,930 B2 * 9/2018 Sorrentino ........ H04W 56/0025
10,419,424 B2 * 9/2019 Pang ..................... H04W 76/10
(Continued)

FOREIGN PATENT DOCUMENTS

| CN | 105578382 A | 5/2016 |
|---|---|---|
| CN | 106792425 A | 5/2017 |

(Continued)

OTHER PUBLICATIONS

International Search Report and Written Opinion dated Aug. 7, 2018 for PCT/CN2018/087086 filed on May 16, 2018, 15 pages including English Translation of the International Search Report.

*Primary Examiner* — Marceau Milord
(74) *Attorney, Agent, or Firm* — Xsensus, LLP

(57) ABSTRACT

The present invention relates to an electronic device in a wireless communication system, and a wireless communication method. The electronic device in a wireless communication system of the present invention comprises: a processing circuit configured to generate resource indication information for indicating resources carrying discovery information; and a transceiver circuit configured to send the resource indication information. The electronic device and the wireless communication method of the present invention can implement a discovery process of a bandwidth-limited remote device, shorten discovery time, and save energy of the remote device and a relay device.

18 Claims, 13 Drawing Sheets

(51) Int. Cl.
*H04B 17/318* (2015.01)
*H04W 8/00* (2009.01)

(58) Field of Classification Search
USPC ............... 370/329, 252, 254, 255, 328, 335
See application file for complete search history.

(56) References Cited

U.S. PATENT DOCUMENTS

| | | | | |
|---|---|---|---|---|
| 10,742,621 | B2* | 8/2020 | Lancioni | H04W 12/086 |
| 2014/0206348 | A1* | 7/2014 | Johnsson | H04W 8/005 |
| | | | | 455/434 |
| 2015/0117375 | A1* | 4/2015 | Sartori | H04W 56/002 |
| | | | | 370/329 |
| 2015/0347338 | A1* | 12/2015 | Shippy | G06F 13/4027 |
| | | | | 710/314 |
| 2016/0119739 | A1* | 4/2016 | Hampel | H04W 4/38 |
| | | | | 370/315 |
| 2016/0142974 | A1* | 5/2016 | Lindoff | H04W 52/0209 |
| | | | | 370/311 |
| 2016/0192171 | A1* | 6/2016 | Takano | H04W 76/14 |
| | | | | 370/329 |
| 2017/0347338 | A1* | 11/2017 | Chen | H04W 72/005 |
| 2018/0035276 | A1* | 2/2018 | Kang | H04W 48/08 |
| 2018/0110001 | A1* | 4/2018 | Yasukawa | H04W 52/0219 |
| 2018/0167775 | A1* | 6/2018 | Tian | H04W 64/003 |
| 2018/0192397 | A1* | 7/2018 | Seo | H04W 72/02 |
| 2018/0227972 | A1* | 8/2018 | Tsuboi | H04W 92/18 |
| 2018/0227973 | A1* | 8/2018 | Tsuboi | H04W 72/042 |
| 2018/0343627 | A1* | 11/2018 | Thangarasa | H04W 4/80 |
| 2018/0359749 | A1* | 12/2018 | Liu | H04W 4/70 |
| 2019/0098484 | A1* | 3/2019 | Park | H04W 74/0833 |
| 2019/0230578 | A1* | 7/2019 | Karaki | H04W 74/0816 |
| 2020/0053544 | A1* | 2/2020 | Lindoff | H04W 76/14 |
| 2020/0120458 | A1* | 4/2020 | Aldana | H04W 36/08 |
| 2020/0280961 | A1* | 9/2020 | Lee | H04W 4/40 |
| 2020/0296567 | A1* | 9/2020 | Deng | H04W 36/0069 |

FOREIGN PATENT DOCUMENTS

| | | |
|---|---|---|
| CN | 106792890 A | 5/2017 |
| CN | 107371193 A | 11/2017 |
| WO | 2014/190950 A1 | 12/2014 |

* cited by examiner

ELECTRONIC DEVICE IN WIRELESS COMMUNICATION SYSTEM, AND WIRELESS COMMUNICATION METHOD

CROSS-REFERENCE TO RELATED APPLICATIONS

The present application is based on PCT filing PCT/CN2018/087086, filed May 16, 2018, which claims priority to Chinese Patent Application No. 201710680648.1, filed Aug. 10, 2017 with the Chinese Patent Office, each of which is incorporated herein by reference in its entirety.

FIELD

Embodiments of the present disclosure generally relate to the technical field of wireless communications, and in particular to an electronic device in a wireless communication system and a wireless communication method. More particularly, the present disclosure relates to an electronic device as a network side device in a wireless communication system, an electronic device as a relay device in a wireless communication system, and an electronic device as a remote device in a wireless communication system, a wireless communication method performed by a network side device in a wireless communication system, a wireless communication method performed by a relay device in a wireless communication system, and a wireless communication method performed by a remote device in a wireless communication system.

BACKGROUND

In a further enhanced device to device (FeD2D) communication system, a remote device may communicate with a network side device (for example, a base station) through a relay device. Specifically, the remote device communicates with the relay device through a side link, and the relay device communicates with the network side device through a conventional cellular link. For uplink communication, the remote device first communicates with the relay device through the side link, and then the relay device communicates with the network side device through the conventional cellular link. For downlink communication, according to different receiving links, the remote device may be divided into a device of a first type (type 1) and a device of a second type (type 2). The device of the first type has a capability of receiving information from the side link, that is, the relay device receives downlink data from the network side device through the conventional cellular link, and then the relay device transmits the downlink data to the remote device through the side link. The remote device may also receive the downlink data directly from the network side device through the conventional cellular link. The device of the second type does not have the capability of receiving the information from the side link, that is, the remote device can only receive the downlink data from the network side device through the conventional cellular link.

In addition, in the FeD2D communication system, the remote device may be bandwidth-limited, that is, transmission bandwidth and reception bandwidth of the remote device only occupy a part of the frequency bands, rather than full frequency bands.

For a bandwidth-limited remote device of the first type, in a case that a resource for the relay device transmitting the discovery information is beyond the reception bandwidth of the remote device, the remote device and the relay device cannot discover each other in the current discovery period, resulting in a prolonged discovery time period between the remote device and the relay device, which is disadvantageous for energy saving of the remote device and the relay device. For a bandwidth-limited remote device of the second type, since the remote device cannot receive the downlink data through the side link, a conventional discovery process is no longer applicable to the remote device of this type.

Therefore, it is necessary to provide a technical solution to implement a discovery process for a bandwidth-limited remote device.

SUMMARY

This summary part provides a general summary of the present disclosure, rather than discloses a full scope or all features thereof.

An object of the present disclosure is to provide an electronic device and a wireless communication method, to implement a discovery process for a bandwidth-limited remote device.

According to an aspect of the present disclosure, an electronic device in a wireless communication system is provided, which includes: a processing circuit configured to generate resource indication information for indicating a resource carrying discovery information; and a transceiver circuit configured to transmit the resource indication information.

According to another aspect of the present disclosure, an electronic device in a wireless communication system is provided, which includes: a transceiver circuit configured to receive resource indication information for indicating a resource carrying discovery information; and a processing circuit configured to determine, according to the resource indication information, information associated with the resource carrying discovery information.

According to another aspect of the present disclosure, a wireless communication method performed by an electronic device in a wireless communication system is provided, which includes: generating resource indication information for indicating a resource carrying discovery information; and transmitting the resource indication information.

According to another aspect of the present disclosure, a wireless communication method performed by an electronic device in a wireless communication system is provided, which includes: receiving resource indication information for indicating a resource carrying discovery information; and determining, according to the resource indication information, information associated with the resource carrying discovery information.

According to another aspect of the present disclosure, an electronic device in a wireless communication system is provided, which includes: a transceiver circuit configured to transmit, to a relay device and a remote device within a service range of the electronic device, information regarding groups divided based on history information of a connection relation between the relay device and the remote device, and receive, from the relay device or the remote device within the service range of the electronic device, request information of a group-based discovery process; and a processing circuit configured to determine whether the relay device or the remote device is capable of performing the group-based discovery process.

According to another aspect of the present disclosure, a computer-readable storage medium is provided, which includes computer executable instructions. The computer executable instructions, when executed by an information processing device, cause the information processing device to execute the wireless communication method according to the present disclosure.

With the electronic device in a wireless communication system and the wireless communication method according to the present disclosure, the electronic device may generate resource indication information for indicating a resource carrying discovery information and transmit the resource indication information, such that the remote device and the relay device can learn a resource for transmitting the discovery information by the other party, thereby implementing the discovery process of the bandwidth-limited remote device, thus shortening the discovery time period, and saving the energy of the remote device and the relay device.

Further applicability regions will become apparent according to the description provided herein. The descriptions and specific examples in the summary are only illustrative and are not intended to limit the scope of the present disclosure.

BRIEF DESCRIPTION OF THE DRAWINGS

The drawings are only used for showing the selected embodiments rather than all possible embodiments, and are not intended to limit the scope of the present disclosure. In the drawings.

Figure 1:
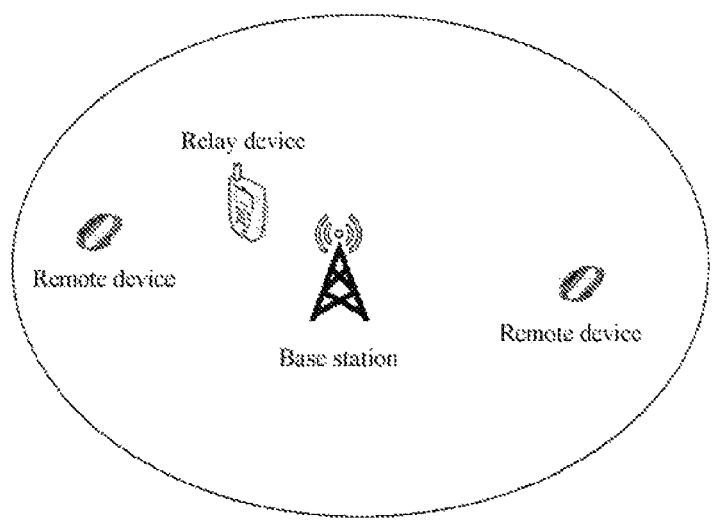
FIG. 1 is a schematic diagram showing an application scenario according to the present disclosure.

Although various modification and alternations are easily made onto the present disclosure, the specific embodiments are shown in the drawings as an example, and are described in detail here. It should be understood that description for the specific embodiments is not intended to limit the present disclosure into a disclosed specific form, and the present disclosure aims to cover all modification, equivalents and alternations within the spirit and scope of the present disclosure. It is noted that throughout the several figures, corresponding reference numerals indicate corresponding parts.

DETAILED DESCRIPTION OF EMBODIMENTS

Examples of the present disclosure are described fully now with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Examples of many specific details such as specific components, devices and methods are described to provide thorough understanding for the embodiments of the present disclosure. It will be apparent to those skilled in the art that exemplary embodiments may be implemented in many different forms without the use of specific details, and they should not be construed as limiting the scope of the present disclosure. In some exemplary embodiments, processes, structures and technologies, which are well known, are not described in detail.

<Application Scenario>

FIG. 1 is a schematic diagram showing an application scenario according to the present disclosure. As shown in FIG. 1, there are multiple terminal devices in a coverage of a base station, which include a terminal device serving as a relay device and a terminal device serving as a remote device. FIG. 1 shows a situation in which there is one relay device and two remote devices in the coverage of the base station. In an actual scenario, there may be more or less relay devices and more or less remote devices.

In the scenario shown in FIG. 1, the remote device may be bandwidth-limited. In addition, the remote device may be of a first type or a second type.

FIG. 1 shows an exemplary scenario of the present disclosure, and the application scenario of the present disclosure is not limited thereto. The technical solution of the present disclosure is applicable to all electronic devices that need to perform a discovery process.

According to an embodiment of the present disclosure, a resource pool of a wireless communication system may be divided into multiple narrow-band resource pools in a frequency domain, and each of the narrow-band resource pools occupies a part of bandwidths, that is, each of the narrow-band resource pools includes one or more physical resource blocks (PRB), such as one PRB or six PRBs. In this case, the narrow-band resource pools may be numbered, that is, there is one-to-one correspondence between the narrow-band resource pools and the numbers of the narrow-band resource pools. In addition, the resource pool may also be divided into multiple resource sets, each of the resource sets may include multiple narrow-band resource pools, or include multiple PRBs, where the narrow-band resource pools or PRBs may be arranged continuous or discontinuous. In this case, the resource sets may be numbered, that is, there is one-to-one correspondence between the resource sets and the numbers of the resource sets. Each resource carrying discovery information described hereinafter in the present disclosure refers to one of the narrow-band resource pools or one of the resource sets described above. Further, the resource pool may be applicable to short-range (such as D2D or Vehicle to X (V2X)) communication.

In addition, the base station in the present disclosure may be, for example, an eNB, or may be a base station in a fifth generation communication system (gNB), which is not limited in this disclosure.

<Structure of Electronic Device>

Figure 2:
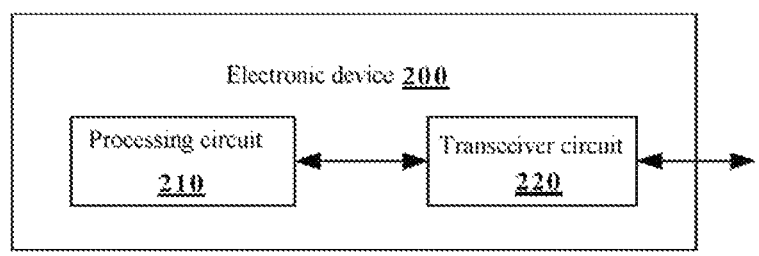
FIG. 2 is a block diagram showing a configuration example of an electronic device according to an embodiment of the present disclosure.

FIG. 2 is a block diagram showing a configuration example of an electronic device 200 according to an embodiment of the present disclosure. The electronic device 200 herein may serve as a terminal device in a wireless communication system. Specifically, the electronic device 200 may serve as a relay device in a wireless communication system.

As shown in FIG. 2, the electronic device 200 may include a processing circuit 210 and a transceiver circuit 220. It should be noted that the electronic device 200 may include one processing circuit 210 or multiple processing circuits 210. Further, the processing circuit 210 may include various types of discrete functional units to perform different functions and/or operations. It should be noted that, the functional units may be physical entities or logical entities, and units with different names may be implemented by the same physical entity.

Figure 3:
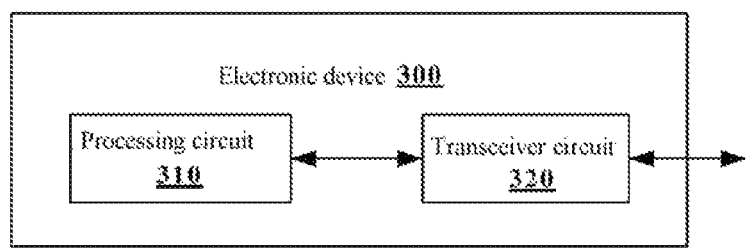
FIG. 3 is a block diagram showing a configuration example of an electronic device according to another embodiment of the present disclosure.

FIG. 3 is a block diagram showing a configuration example of an electronic device 300 according to an embodiment of the present disclosure. The electronic device 300 herein may serve as a terminal device in a wireless communication system. Specifically, the electronic device 300 may serve as a remote device in a wireless communication system.

As shown in FIG. 3, the electronic device 300 may include a processing circuit 310 and a transceiver circuit 320. It should be noted that, the electronic device 300 may include one processing circuit 310 or multiple processing circuits 310. Further, the processing circuit 310 may include various types of discrete functional units to perform different functions and/or operations. It should be noted that, the functional units may be physical entities or logical entities, and units with different names may be implemented by the same physical entity.

Figure 4:
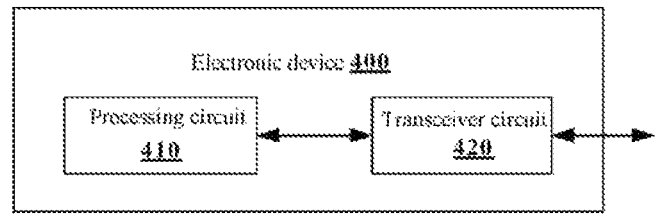
FIG. 4 is a block diagram showing a configuration example of an electronic device according to another embodiment of the present disclosure.

FIG. 4 is a block diagram showing a configuration example of an electronic device 400 according to an embodiment of the present disclosure. The electronic device 400 herein may serve as a network side device in a wireless communication system, for example, a base station.

As shown in FIG. 4, the electronic device 400 may include a processing circuit 410 and a transceiver circuit 420. It should be noted that, the electronic device 400 may include one processing circuit 410 or multiple processing circuits 410. Further, the processing circuit 410 may include various types of discrete functional units to perform different functions and/or operations. It should be noted that, the functional units may be physical entities or logical entities, and units with different names may be implemented by the same physical entity.

First Embodiment

In the embodiment, the electronic device 200 serving as a relay device transmits resource indication information to a network side device 400. The electronic device 300 serving as a remote device may be of the first type as described above.

According to the embodiment of the present disclosure, the processing circuit 210 of the electronic device 200 may generate resource indication information for indicating a resource carrying discovery information.

According to the embodiment of the present disclosure, the transceiver circuit 220 of the electronic device 200 may transmit the resource indication information.

According to the embodiment of the present disclosure, the resource indication information may indicate a resource for the electronic device 200 transmitting the discovery information. Here, the resource indication information may indicate a resource for the electronic device 200 transmitting the discovery information in a next discovery period.

According to the embodiment of the present disclosure, the discovery information may include information regarding a discovery process, such as a discovery announcement message and a discovery response message, that is transmitted by the electronic device 200 serving as a relay device. As described above, a resource pool may be divided into narrow-band resource pools or resource sets in the frequency domain. Thus, in all the embodiments of the present disclosure hereinafter, the resource indication information may indicate a narrow-band resource. In addition, the resource for carrying discovery information may be represented in various ways, such as time-frequency resource information, the number of the narrow-band resource pool, and the number of the resource set. That is, a device that receives the resource indication information may determine, according to the resource indication information, a resource for the electronic device 200 carrying the discovery information.

According to the embodiment of the present disclosure, the transceiver circuit 220 may be configured to periodically transmit the resource indication information to the electronic device 400 serving as a network side device. The electronic device 400 herein may provide a service to the electronic device 200, that is, the electronic device 200 may located within the coverage of the electronic device 400. Here, the resource indication information may be carried in a measurement report transmitted by the electronic device 200 to the electronic device 400, or may be carried in side link UE information transmitted by the electronic device 200 to the electronic device 400, but the present disclosure is not limited thereto. Further, the electronic device 200 may also transmit, to the electronic device 400, reference signal received power RSRP information regarding the electronic device 400 measured by the electronic device 200. Preferably, the information may be reported periodically, may be reported together with the resource indication information, or may be reported separately from the resource indication information.

According to the embodiment of the present disclosure, the transceiver circuit 420 of the electronic device 400 may receive the resource indication information for indicating the resource carrying discovery information.

According to the embodiment of the present disclosure, the processing circuit 410 of the electronic device 400 may determine information associated with the resource carrying discovery information according to the resource indication information.

According to the embodiment of the present disclosure, the transceiver circuit 420 of the electronic device 400 may receive the resource indication information from a terminal device serving as a relay device within the coverage of the electronic device 400, for example, the electronic device 200. The resource indication information is used to indicate a resource for the electronic device 200 transmitting the discovery information. That is, the electronic device 400 may receive the resource indication information from each relay device within the coverage of the electronic device 400.

According to the embodiment of the present disclosure, the processing circuit 410 may determine the priority of each resource carrying discovery information in the resource pool according to the resource indication information. That is, the information associated with each resource carrying discovery information refers to the priority of the resource carrying discovery information. Here, the resource carrying discovery information may be a narrow-band resource pool or a resource set as described above.

According to the embodiment of the present disclosure, the processing circuit 410 may determine, for each resource carrying discovery information, the number of resource indication information for the resource included in all the received resource indication information. Next, the processing circuit 410 may determine that the priority of the resource is proportional to the number of the resource indication information for the resource, that is, a great number of the resource indication information for the resource represents that the resource has a high priority. In this manner, processing circuit 410 may determine the priority of each resource carrying discovery information in the resource pool.

According to the embodiment of the present disclosure, the transceiver circuit 420 may periodically broadcast priority information of each resource carrying discovery information in the resource pool.

According to the embodiment of the present disclosure, in a case that the electronic device 300 serving as a remote device receives the priority information periodically broadcast by the electronic device 400 (the electronic device 300 may be located within the coverage of the electronic device 400), the processing circuit 310 of the electronic device 300 may select and monitor a resource carrying discovery information according to the priority information, to receive the discovery information transmitted by the electronic device 200. Preferably, the processing circuit 310 may select and monitor a resource with a higher priority. In addition, the processing circuit 310 may also select a resource according to the reference signal receiving power RSRP information regarding the electronic device 300 and the priority information.

According to the embodiment of the present disclosure, the transceiver circuit 420 may not periodically broadcast the priority information. The electronic device 300 may initiate, to the electronic device 400, request information for requesting priority information of each resource carrying discovery information in the resource pool. In a case of receiving the request information, the electronic device 400 may transmit the priority information to the electronic device 300. For example, the electronic device 400 may transmit the priority information to the electronic device 300 through high layer signaling, for example, radio resource control (RRC) signaling.

Figure 5:
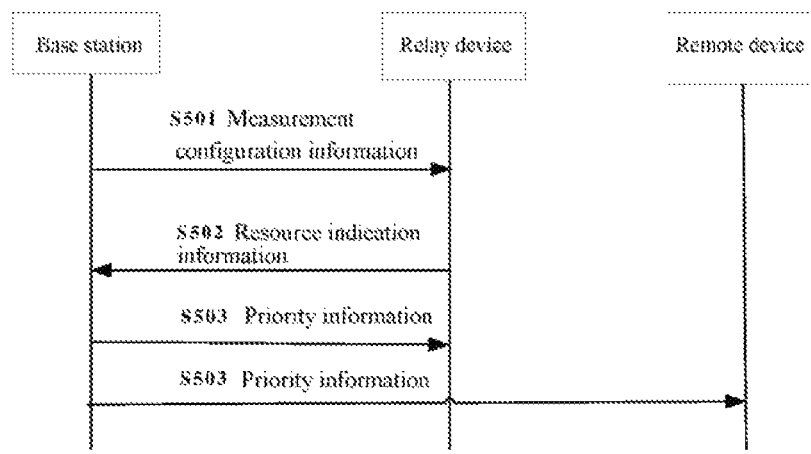
FIG. 5 is a schematic diagram showing a signaling flow according to a first embodiment of the present disclosure.

FIG. 5 is a schematic diagram showing a signaling flow according to the first embodiment of the present disclosure. As shown in FIG. 5, a base station may be implemented by the electronic device 400, and a relay device may be implemented by the electronic device 200, and a remote device may be implemented by the electronic device 300. In step S501, the base station transmits measurement configuration information to the relay device. The measurement configuration information herein may include configuration information related to the measurement, such as a measurement period and a measured object. Next, in step S502, the relay device reports resource indication information to the base station. Here, although FIG. 5 shows only one relay device, each relay device within the coverage of the base station may report the resource indication information to the base station. Next, in step S503, the base station determines, according to the received resource indication information, the priority of each resource carrying discovery information in the resource pool, and broadcasts and transmits priority information of the resource. That is, both the relay device and the remote device within the coverage of the base station may receive such priority information. It should be noted that FIG. 5 only shows an example of the base station broadcasting and transmitting the priority information. In an alternative embodiment, the remote device may also initiate the request information to the base station to make the base station transmit the priority information to the remote device.

As described above, according to the first embodiment of the present disclosure, the base station may collect resources for the relay device transmitting the discovery information, and determine the priority information of the resources and notify the remote device of the priority information, to enable the remote device to monitor a resource of a higher priority. In this way, the resource monitored by the remote device is a resource for the relay device transmitting the discovery information in a large probability, such that the remote device can successfully receive the discovery information, thereby shortening the time period of the discovery process, and saving the energy of the remote device and the relay device.

Second Embodiment

In the embodiment, the electronic device 300 serving as a remote device transmits resource indication information to a network side device 400. The electronic device 300 serving as a remote device may be of the first type as described above.

According to the embodiment of the present disclosure, the processing circuit 310 of the electronic device 300 may generate resource indication information for indicating a resource carrying discovery information.

According to the embodiment of the present disclosure, the transceiver circuit 320 of the electronic device 300 may transmit the resource indication information.

According to the embodiment of the present disclosure, the resource indication information may indicate a resource for the electronic device 300 receiving the discovery information. Here, the resource indication information may indicate a resource for the electronic device 300 receiving the discovery information in a next discovery period.

According to the embodiment of the present disclosure, the discovery information may include information regarding a discovery process, such as a discovery announcement message and a discovery response message, that is received by the electronic device 300 serving as a remote device. In addition, the resource carrying discovery information may be represented in various ways, such as time-frequency resource information, the number of a narrow-band resource pool, and the number of a resource set. That is, a device that receives the resource indication information may determine, according to the resource indication information, a resource for the electronic device 300 carrying discovery information.

According to the embodiment of the present disclosure, the transceiver circuit 320 may be configured to periodically transmit the resource indication information to the electronic device 400 serving as a network side device. The electronic device 400 herein may provide a service to the electronic device 300, that is, the electronic device 300 may be located within the coverage of the electronic device 400. Here, the resource indication information may be carried in a measurement report transmitted by the electronic device 300 to the electronic device 400, or may be carried in side link UE information transmitted by the electronic device 300 to the electronic device 400, but the present disclosure is not limited thereto. Further, the electronic device 300 may also transmit, to the electronic device 400, reference signal received power RSRP information regarding the electronic device 400 measured by the electronic device 300. Preferably, the information may be reported periodically, may be reported together with the resource indication information, or may be reported separately from the resource indication information.

According to the embodiment of the present disclosure, the transceiver circuit 420 of the electronic device 400 may receive the resource indication information for indicating the resource carrying discovery information.

According to the embodiment of the present disclosure, the processing circuit 410 of the electronic device 400 may determine information associated with the resource carrying discovery information according to the resource indication information.

According to the embodiment of the present disclosure, the transceiver circuit 420 of the electronic device 400 may receive the resource indication information from a terminal device serving as a remote device within the coverage of the electronic device 400. For example, the electronic device 300 receives the resource indication information, and the resource indication information is used to indicate a resource for the electronic device 300 receiving the discovery information. That is, the electronic device 400 may receive the resource indication information from each remote device within the coverage of the electronic device 400.

According to the embodiment of the present disclosure, the processing circuit 410 may determine the priority of each resource carrying discovery information in the resource pool according to the resource indication information. That is, the information associated with each resource carrying discovery information refers to the priority of the resource carrying discovery information. Here, the resource carrying discovery information may be a narrow-band resource pool or a resource set as described above.

According to the embodiment of the present disclosure, the processing circuit 410 may determine, for each resource carrying discovery information, the number of resource indication information for the resource included in all the received resource indication information. Next, the processing circuit 410 may determine that the priority of the resource is proportional to the number of the resource indication information for the resource, that is, a great number of the resource indication information for the resource represents that the resource has a high priority. In this manner, processing circuit 410 may determine the priority of each resource carrying discovery information in the resource pool.

According to the embodiment of the present disclosure, the transceiver circuit 420 may periodically broadcast priority information of each resource carrying discovery information in the resource pool.

According to the embodiment of the present disclosure, in a case that the electronic device 200 serving as a relay device receives the priority information periodically broadcast by the electronic device 400 (the electronic device 200 may be located within the coverage of the electronic device 400), the processing circuit 210 of the electronic device 200 may select multiple resources carrying discovery information according to the priority information for transmitting the discovery information, so as to transmit the discovery information to the electronic device 300. Preferably, the processing circuit 210 may select multiple resources with higher priorities. In addition, the processing circuit 210 may also select resources according to the reference signal receiving power RSRP information regarding the electronic device 200 and/or a range of D2D communication and the priority information.

According to an embodiment of the present disclosure, the transceiver circuit 420 may also not periodically broadcast the priority information. The electronic device 200 may initiate, to the electronic device 400, request information for requesting the priority information of each resource carrying discovery information in the resource pool. In a case of receiving the request information, the electronic device 400 may transmit the priority information to the electronic device 200. For example, the electronic device 400 may transmit the priority information to the electronic device 200 through high layer signaling, such as radio resource control (RRC) signaling.

Figure 6:
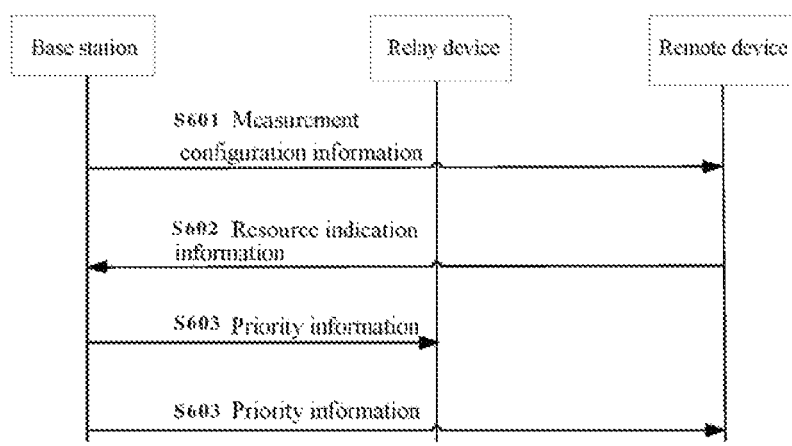
FIG. 6 is a schematic diagram showing a signaling flow according to a second embodiment of the present disclosure.

FIG. 6 is a schematic diagram showing a signaling flow according to the second embodiment of the present disclosure. As shown in FIG. 6, a base station may be implemented by the electronic device 400, a relay device may be implemented by the electronic device 200, and a remote device may be implemented by the electronic device 300. In step S601, the base station transmits measurement configuration information to the remote device. The measurement configuration information herein may include configuration information related to the measurement, such as a measurement period and a measured object. Next, in step S602, the remote device reports the resource indication information to the base station. Here, although FIG. 6 shows only one remote device, each remote device within the coverage of the base station may report the resource indication information to the base station. Next, in step S603, the base station determines, according to the received resource indication information, the priority of each resource carrying discovery information in the resource pool, and broadcasts and transmits the priority information of the resource. That is, both the relay device and the remote device within the coverage of the base station can receive the priority information. It should be noted that FIG. 6 only shows an example of the base station broadcasting and transmitting the priority information. In an alternative embodiment, the relay device may also initiate the request information to the base station to make the base station transmit the priority information to the relay device.

As described above, according to the second embodiment of the present disclosure, the base station may collect resources for the remote device receiving the discovery information, and determine the priority information of the resources and notify the relay device of the priority information, such that the relay device can transmit the discovery information on a resource of a high priority. In this way, the resource for the relay device transmitting the discovery information is a resource for the remote device monitoring the discovery information in a large probability, such that the remote device can successfully receive the discovery information, thereby shortening the time period of the discovery process, and saving the energy of the remote device and the relay device.

Third Embodiment

In the embodiment, the network side device 400 transmits resource indication information to the electronic device 300 serving as a remote device and the electronic device 200 serving as a relay device. The electronic device 300 serving as a remote device may be of the first type as described above.

According to the embodiment of the present disclosure, the processing circuit 410 of the electronic device 400 may generate resource indication information for indicating a resource carrying discovery information.

According to the embodiment of the present disclosure, the transceiver circuit 420 of the electronic device 400 may transmit the resource indication information.

According to the embodiment of the present disclosure, the resource indication information may be used to indicate a relationship between each resource carrying discovery information in the resource pool and a position of a terminal device that transmits or receives the discovery information. That is, the resource indication information generated by the processing circuit 410 may map each resource carrying discovery information in the resource pool to the position of the terminal device. Here, the terminal device that transmits the discovery information may include the electronic device 200 serving as a relay device, and the terminal device that receives the discovery information may include the electronic device 300 serving as a remote device.

Further, as described above, the discovery information may include information regarding a discovery process, such as a discovery announcement message and a discovery response message, that is received by the electronic device 300 serving as a remote device. In addition, the resource carrying discovery information may be represented in various ways, such as time-frequency resource information, the number of a narrow-band resource pool, and a number of a resource set.

According to the embodiment of the present disclosure, the processing circuit 410 may represent a position of a terminal device that transmits or receives discovery information by using the RSRP. That is, the processing circuit 410 may generate resource indication information for indicating a relationship between each resource carrying discovery information in the resource pool and the RSRP. The RSRP here refers to a reference signal received power received by the terminal device from the electronic device 400, that is, the RSRP regarding the electronic device 400 measured by the terminal device. For example, the processing circuit 410 may generate a mapping table as shown below.

TABLE 1

| Number of a narrow-band resource pool | RSRP range |
|---|---|
| 1 | RSRP range 1 |
| 2 | RSRP range 2 |
| ... | ... |

As shown in Table 1, a RSRP range 1 and a RSRP range 2 indicate ranges of the RSRP set by the processing circuit 410. Table 1 only shows an example in which the resource carrying discovery information is represented by the number of a narrow-band resource pool. However, the resource carrying discovery information may also be represented in other ways.

Figure 7:
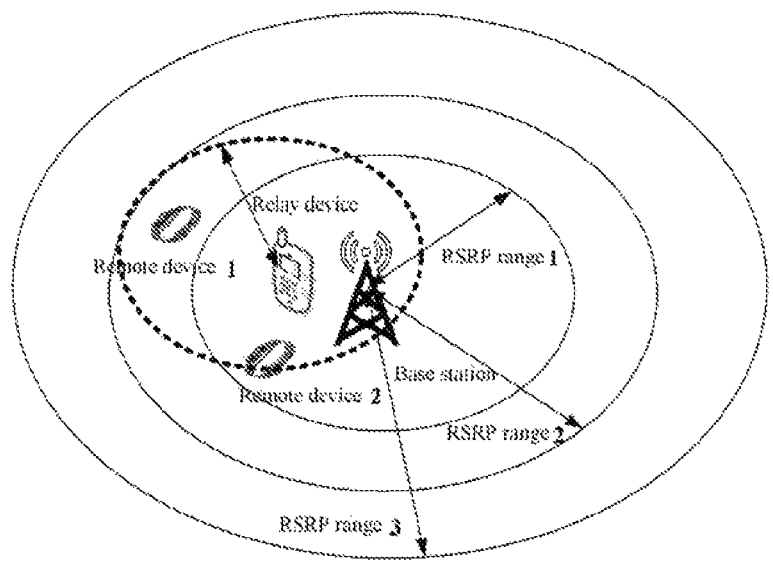
FIG. 7 is a schematic diagram showing a correspondence between resources and positions of terminal devices according to a third embodiment of the present disclosure.

FIG. 7 is a schematic diagram showing a correspondence between resources and positions of terminal devices according to the third embodiment of the present disclosure. As shown in FIG. 7, the processing circuit 410 of the electronic device 400 serving as a base station divides an area within its coverage into three sub-areas according to the RSRP. An area corresponding to the RSRP range 1 is a circular area, an area corresponding to the RSRP range 2 is an annular area, and an area corresponding to the RSRP range 3 is also an annular area. As shown in FIG. 7, the relay device and the remote device 2 are located in the RSRP range 1, and the remote device 1 is located in the RSRP range 2.

According to the embodiment of the present disclosure, the electronic device 400 may periodically broadcast the resource indication information as described above, such that both the electronic device 200 serving as a relay device and the electronic device 300 serving as a remote device within the coverage of the electronic device 400 can receive the resource indication information.

According to the embodiment of the present disclosure, the transceiver circuit 220 of the electronic device 200 may receive resource indication information for indicating a resource carrying discovery information. Next, the processing circuit 210 may determine information associated with the resource carrying discovery information according to the resource indication information.

Here, the electronic device 200 may receive the resource indication information from a network side device that provides a service to the electronic device 200, for example, the electronic device 400. The resource indication information may be used to indicate the relationship between each resource carrying discovery information in the resource pool and the position of the electronic device 200 as described above.

According to the embodiment of the present disclosure, the processing circuit 210 may determine, according to the position of the electronic device 200, the range of D2D communication of the electronic device 200, and the resource indication information received by the electronic device 200, a resource for the electronic device 200 transmitting the discovery information. That is, the information associated with the resource carrying discovery information refers to the resource used to transmit the discovery information.

Here, the processing circuit 210 may indicate the position of the electronic device 200 by using the RSRP regarding the electronic device 400 measured by the electronic device 200. That is, the processing circuit 210 may measure the reference signal received power RSRP received by the electronic device 200 from the electronic device 400. Further, the processing circuit 210 may also determine a range of D2D communication of the electronic device 200 and determine a resource for transmitting the discovery information according to the RSRP, the range of D2D communication, and the resource indication information. Here, the resource for transmitting the discovery information may include multiple resources.

According to the embodiment of the present disclosure, the processing circuit 210 may determine a resource corresponding to an RSRP range included in the range of D2D communication of the electronic device 200 as a resource for transmitting the discovery information. As shown in FIG. 7, a dotted circle around a relay device indicates a range of D2D communication of the relay device, and the range of D2D communication of the relay device includes the RSRP range 1 and the RSRP range 2. Therefore, in a case that of receiving resource indication information as shown in Table 1, the relay device may determine that the resource corresponding to the RSRP range 1 is a narrow-band resource pool numbered as 1, and the resource corresponding to the RSRP range 2 is a narrow-band resource pool numbered as 2. Therefore, the relay device may determine to transmit the discovery information by using the narrow-band resource pools numbered as 1 and 2.

According to the embodiment of the present disclosure, the transceiver circuit 320 of the electronic device 300 may also receive the resource indication information for indicating a resource carrying discovery information. Next, the processing circuit 310 may determine information associated with the resource carrying discovery information according to the resource indication information.

Here, the electronic device 300 may receive the resource indication information from a network side device that provides a service to the electronic device 300, for example, the electronic device 400. The resource indication information may be used to indicate the relationship between each resource carrying discovery information in the resource pool and the position of the electronic device 300 as described above.

According to the embodiment of the present disclosure, the processing circuit 310 may determine, according to the position of the electronic device 300 and the resource indication information received by the electronic device 300, the resource for the electronic device 300 receiving the discovery information. That is, the information associated with the resource carrying discovery information refers to a resource used to receive the discovery information.

Here, the processing circuit 310 may represent the position of the electronic device 300 by using the RSRP regarding the electronic device 400 measured by the electronic device 300. That is, the processing circuit 310 may measure the reference signal received power RSRP received by the electronic device 300 from the electronic device 400. Further, the processing circuit 310 may further determine a resource for receiving the discovery information according to the RSRP and the resource indication information. Here, the resource for receiving the discovery information may include one resource.

According to the embodiment of the present disclosure, the processing circuit 310 may determine a resource corresponding to a RSRP range in which the RSRP of the electronic device 300 is located as a resource for receiving the discovery information. As shown in FIG. 7, the RSRP of the remote device 1 is located in the RSRP range 2, the RSRP of the remote device 2 is located in the RSRP range 1. Therefore, in a case of receiving the resource indication information as shown in Table 1, the remote device 1 may determine that the resource corresponding to the RSRP range 2 is a narrow-band resource pool numbered as 2, so as to determine to monitor the discovery information by using the narrow-band resource pool numbered as 2. Similarly, in a case of receiving the resource indication information as shown in Table 1, the remote device 2 may determine that the resource corresponding to the RSRP range 1 is a narrow-band resource pool numbered as 1, so as to determine to monitor the discovery information by using the narrow-band resource pool numbered as 1.

Figure 8:
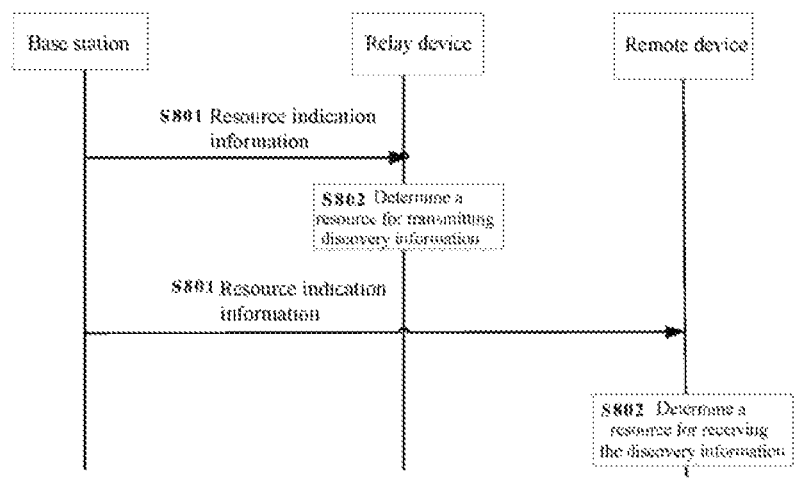
FIG. 8 is a schematic diagram showing a signaling flow according to the third embodiment of the present disclosure.

FIG. 8 is a schematic diagram showing a signaling flow according to the third embodiment of the present disclosure. As shown in FIG. 8, in step S801, the base station may generate resource indication information and broadcast and transmit the resource indication information. In step S802, the relay device may determine a resource for transmitting the discovery information according to the resource indication information, and the remote device may determine a resource for receiving the discovery information according to the resource indication information.

As described above, according to the third embodiment of the present disclosure, the base station may implement a mapping relationship between the resource and the geographical position information, and notify the relay device and the remote device of the mapping relationship, such that the relay device and the remote device can determine the resource for transmitting or receiving the discovery information according to the geographic position information. In this way, the relay device may transmit the discovery information on multiple resources, and the remote device only needs to monitor the discovery information on one resource. Since the resource for the remote device monitoring the discovery information is the resource for the relay device transmitting the discovery information, the remote device can successfully receive the discovery information, thereby shortening the time period of the discovery process, and saving the energy of the remote device and the relay device.

Fourth Embodiment

In the embodiment, the electronic device 200 serving as a relay device transmits resource indication information to the electronic device 300 serving as a remote device, and the electronic device 300 serving as a remote device may also transmit the resource indication information to the electronic device 200 serving as a relay device. The electronic device 300 serving as a remote device may be of the first type as described above.

According to the embodiment of the present disclosure, the processing circuit 210 of the electronic device 200 may generate resource indication information for indicating a resource carrying discovery information.

According to the embodiment of the present disclosure, the transceiver circuit 220 of the electronic device 200 may transmit the resource indication information.

According to the embodiment of the present disclosure, the resource indication information may indicate a resource for the electronic device 200 transmitting discovery information. Here, the resource indication information may indicate a resource for the electronic device 200 transmitting the discovery information in a next discovery period.

According to the embodiment of the present disclosure, the electronic device 200 may transmit the above resource indication information to the electronic device 300 serving as a remote device. Further, the electronic device 200 may further transmit the above resource indication information to the electronic device 300 through a synchronization message.

According to the embodiment of the present disclosure, the discovery information may include information regarding a discovery process, such as a discovery announcement message and a discovery response message, that is transmitted by the electronic device 200 serving as a relay device. In addition, the resource carrying discovery information may be represented in various ways, such as time-frequency resource information, the number of a narrow-band resource pool, and the number of a resource set. That is, a device that receives the resource indication information may determine, according to the resource indication information, a resource for the electronic device 200 carrying the discovery information.

The synchronization message herein may include a side link synchronisation signal (SLSS) and a master information block-side link (MIB-SL).

According to the embodiment of the present disclosure, the processing circuit 210 may carry the resource indication information in the synchronization message according to various implementations. Specifically, the processing circuit 210 may add the resource indication information in the MIB-SL, and codes obtained by adding the resource indication information in the MIB-SL is given as follows.

```
-- ASN1START
MasterInformationBlock-SL ::=   SEQUENCE {
    sl-Bandwidth-r12                ENUMERATED {
                                        n6, n15, n25, n50,
                                        n75, n100},
    tdd-ConfigSL-r12                TDD-ConfigSL-r12,
    directFrameNumber-r12           BIT STRING (SIZE (10)),
    directSubframeNumber-r12        INTEGER (0..9),
    inCoverage-r12                  BOOLEAN,
    reserved-r12                    BIT STRING (SIZE (19))
    intersted resource indication   BIT String
}
-- ASN1STOP
```

As shown above, the "intersted resource indication" is a newly added instruction for indicating the resource indication information.

In addition, the processing circuit 210 may also add the resource indication information in the SLSS. For example, the processing circuit 210 may add multiple bits for indicating the resource indication information to the SLSS. Here, the numbers of the narrow-band resource pools or the numbers of the resource sets may be mapped to the multiple bits, and the bits with the map are added to the SLSS.

In addition, the processing circuit 210 may also represent the resource indication information by using the SLSS. For example, the processing circuit 210 may map the numbers of the narrow-band resource pools or the numbers of the resource sets to the SLSS.

The description above illustrates three implementations in which the processing circuit 210 transmits the resource indication information through the synchronization message, but the present disclosure is not limited thereto, and the processing circuit 210 may also transmit the resource indication information through the synchronization message according to other implementations.

According to the embodiment of the present disclosure, the transceiver circuit 320 of the electronic device 300 serving as a remote device may receive the above resource indication information for indicating the resource carrying discovery information, and the processing circuit 310 may determine, according to the resource indication information, the information associated with the resource carrying discovery information.

Here, the electronic device 300 may receive the resource indication information from the electronic device 200 serving as a relay device, and the resource indication information is used to indicate a resource for the electronic device 200 transmitting the discovery information. Further, the transceiver circuit 320 may receive the resource indication information through the synchronization message.

According to the embodiment of the present disclosure, the processing circuit 310 may determine, according to the resource indication information, a resource for the electronic device 300 receiving the discovery information. That is, the information associated with the resource carrying discovery information refers to a resource for receiving the discovery information. Here, the resource for receiving the discovery information refers to a resource for receiving the discovery information in a next discovery period.

According to the embodiment of the present disclosure, the processing circuit 310 may select a resource from resources for the electronic device 200 transmitting the discovery information indicated in the resource indication information as the resource for receiving the discovery information. Here, the processing circuit 310 may select the resource according to various implementations, which is not limited by the present disclosure.

Figure 9:
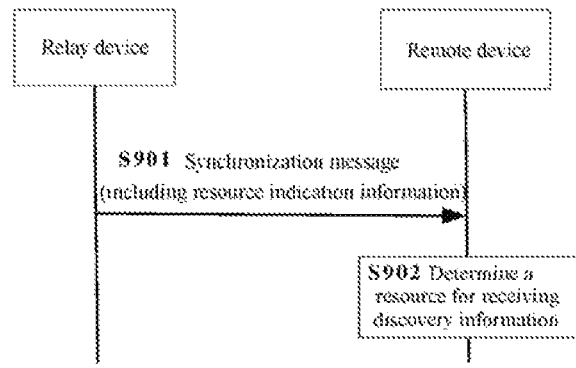
FIG. 9 is a schematic diagram showing a signaling flow according to a fourth embodiment of the present disclosure.

FIG. 9 is a schematic diagram showing a signaling flow according to the fourth embodiment of the present disclosure. As shown in FIG. 9, in step S901, the relay device transmits a synchronization message to the remote device, and the synchronization message includes the resource indication information. Next, in step S902, the remote device determines the resource for receiving the discovery information according to the resource indication information.

The process of transmitting the resource indication information by the electronic device 200 serving as a relay device to the electronic device 300 serving as a remote device is described above. Similarly, the electronic device 300 serving as a remote device may also transmit the resource indication information to the electronic device 200 serving as a relay device.

According to the embodiment of the present disclosure, the processing circuit 310 may generate resource indication information for indicating a resource carrying discovery information, and the transceiver circuit 320 may transmit the resource indication information. The resource indication information herein is used to indicate a resource for the electronic device 300 receiving the discovery information. Here, the resource indication information may indicate a resource for the electronic device 300 receiving the discovery information in a next discovery period.

Further, the transceiver circuit 320 may transmit the resource indication information to the electronic device 200 serving as a relay device. Specifically, the transceiver circuit 320 may transmit the resource indication information to the electronic device 200 through the synchronization message. The specific implementation of transmitting the resource indication information through the synchronization message, the specific implementation of the discovery information, and the representation of the resource carrying discovery information described above are not repeated herein.

Next, the transceiver circuit 220 of the electronic device 200 serving as a relay device may receive the resource indication information for indicating a resource carrying discovery information, and the processing circuit 210 may determine, according to the resource indication information, the information associated with the resource carrying discovery information. Here, the electronic device 200 receives the resource indication information from the electronic device 300 serving as a remote device, and the resource indication information is used to indicate a resource for the electronic device 300 receiving the discovery information. For example, the transceiver circuit 220 may receive the resource indication information through the synchronization message.

According to the embodiment of the present disclosure, the processing circuit 210 may determine a resource for the electronic device 200 transmitting the discovery information according to the resource indication information. That is, the information associated with the resource carrying discovery information refers to a resource used to transmit the discovery information. Here, the resource for transmitting the discovery information refers to a resource for transmitting the discovery information in a next discovery period.

According to the embodiment of the present disclosure, the processing circuit 210 may use the resource for the electronic device 300 receiving the discovery information indicated in the resource indication information as a resource for transmitting the discovery information. Here, in a discovery period, the electronic device 200 may receive the resource indication information from multiple remote devices, and thus the resource for transmitting the discovery information determined by the electronic device 200 may include multiple resources.

Figure 10:
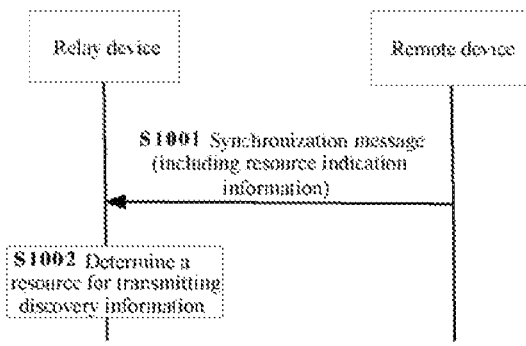
FIG. 10 is a schematic diagram showing a signaling flow according to a fourth embodiment of the present disclosure.

FIG. 10 is a schematic diagram showing a signaling flow according to the fourth embodiment of the present disclosure. As shown in FIG. 10, in step S1001, the remote device transmits a synchronization message to the relay device, and the synchronization message includes the resource indication information. Next, in step S1002, the relay device determines a resource for transmitting the discovery information according to the resource indication information.

As described above, according to the fourth embodiment of the present disclosure, the relay device may inform the remote device of the resource for transmitting the discovery information, or the remote device may notify the relay device of the resource for receiving the discovery information. In this way, a resource for the remote device monitoring the discovery information is a resource for the relay device transmitting the discovery information, such that the remote device can successfully receive the discovery information, thereby shortening the time period of the discovery process, and saving the energy of the remote device and the relay device.

Fifth Embodiment

In the embodiment, the electronic device 200 serving as a relay device transmits resource indication information to the electronic device 300 serving as a remote device, and the electronic device 300 serving as a remote device may also transmit the resource indication information to the electronic device 200 serving as a relay device.

According to the embodiment of the present disclosure, the processing circuit 210 may generate resource indication information for indicating a resource carrying discovery information.

According to the embodiment of the present disclosure, the transceiver circuit 220 of the electronic device 200 may transmit the resource indication information.

According to the embodiment of the present disclosure, the resource indication information may indicate a resource for the electronic device 200 transmitting the discovery information. Here, the resource indication information may indicate a resource for the electronic device 200 transmitting the discovery information in a next discovery period.

According to the embodiment of the present disclosure, the electronic device 200 may transmit the above resource indication information to the electronic device 300 serving as a remote device. Further, the electronic device 200 may further transmit the resource indication information to the electronic device 300 through a discovery announcement message. The resource indication information is used to indicate a resource for the electronic device 200 transmitting the discovery announcement message in a next discovery period.

According to the embodiment of the present disclosure, the resource carrying discovery information may be represented in various ways, such as time-frequency resource information, the number of a narrow-band resource pool, and the number of a resource set. That is, a device that receives the resource indication information may determine, according to the resource indication information, a resource for the electronic device 200 carrying the discovery information.

According to the embodiment of the present disclosure, the transceiver circuit 320 of the electronic device 300 serving as a remote device may receive the above resource indication information for indicating the resource carrying discovery information, and the processing circuit 310 may determine, according to the resource indication information, the information associated with the resource carrying discovery information.

Here, the electronic device 300 may receive the resource indication information from the electronic device 200 serving as a relay device. The resource indication information is used to indicate a resource for the electronic device 200 transmitting the discovery information. Further, the transceiver circuit 320 may receive the resource indication information through the discovery announcement message.

According to the embodiment of the present disclosure, the processing circuit 310 may determine, according to the resource indication information, a resource for the electronic device 300 receiving the discovery information. That is, the information associated with the resource carrying discovery information refers to a resource for receiving the discovery information. Here, the resource for receiving the discovery information refers to a resource for receiving the discovery information in a next discovery period.

According to the embodiment of the present disclosure, the processing circuit 310 may select a resource from resources for the electronic device 200 transmitting the discovery information indicated in the resource indication information as the resource for receiving the discovery information. Here, the processing circuit 310 may select the resource according to various implementations, which is not limited in the present disclosure.

Figure 11:
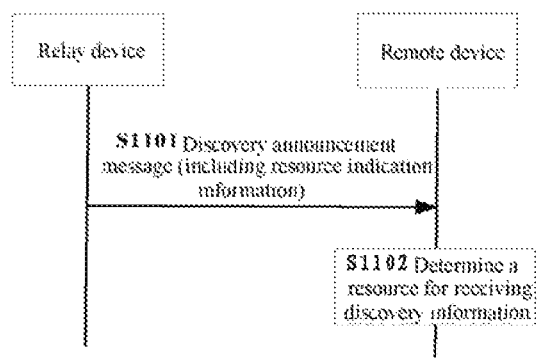
FIG. 11 is a schematic diagram showing a signaling flow according to a fifth embodiment of the present disclosure.

FIG. 11 is a schematic diagram showing a signaling flow according to the fifth embodiment of the present disclosure. As shown in FIG. 11, in step S1101, the relay device transmits a discovery announcement message to the remote device, where the discovery announcement message includes the resource indication information. Next, in step S1102, the remote device determines a resource for receiving the discovery information according to the resource indication information.

The process of transmitting the resource indication information by the electronic device 200 serving as a relay device to the electronic device 300 serving as a remote device is described above. Similarly, the electronic device 300 serving as a remote device may also transmit the resource indication information to the electronic device 200 serving as a relay device.

According to the embodiment of the present disclosure, the processing circuit 310 may generate resource indication information for indicating a resource carrying discovery information, and the transceiver circuit 320 may transmit the resource indication information. The resource indication information herein is used to indicate a resource for the electronic device 300 receiving the discovery information.

Further, the transceiver circuit 320 may transmit the resource indication information to the electronic device 200 serving as a relay device. Specifically, the transceiver circuit 320 may transmit the resource indication information to the electronic device 200 through a discovery request message. The resource indication message is used to indicate a resource for the electronic device 300 receiving the discovery response message. According to the embodiment of the present disclosure, the electronic device 300 may broadcast and transmit the discovery request message.

As described above, in a case that the electronic device 300 broadcasts and transmits the discovery request message, each relay device around the electronic device 300 may receive the discovery request message and transmit a discovery response message according to the resource indicated by the discovery request message. In this way, there may be a large number of relay devices transmitting discovery response messages to the electronic device 300 at the same time by using the same resource, thereby resulting in a collision, thus resulting in interference at the electronic device 300.

According to the embodiment of the present disclosure, the resource indication information carried in the discovery request message may further indicate a relationship between a resource for the electronic device 300 receiving the discovery information and the discovery reference signal received power RSRP information regarding the electronic device 300 measured by the electronic device 200 serving as a relay device.

Here, the resource for the electronic device 300 receiving the discovery information refers to a time resource for the electronic device 300 receiving the discovery information, and the resource carrying discovery information that is carried in the resource indication information as described above refers to a frequency resource for the electronic device 300 receiving the discovery information. That is, the resource indication information may not only indicate the frequency resource for the electronic device 300 receiving the discovery response message, but may also indicate a relationship between the time resource for the electronic device 300 receiving the discovery response message and the discovery reference signal received power RSRP information regarding the electronic device 300 measured by the electronic device 200 serving as a relay device.

According to the embodiment of the present disclosure, the discovery reference signal received power RSRP information regarding the electronic device 300 measured by the electronic device 200 refers to the reference signal received power (hereinafter referred to as SD-RSRP) received from the electronic device 300 measured at the electronic device 200. For example, the discovery request message transmitted by the electronic device 300 may carry information as shown in the following table.

TABLE 2

Number of a narrow-band resource pool carrying discovery information: 1

| Time period for carrying discovery information | SD-RSRP range |
|---|---|
| T1-T2 | SD-RSRP range 1 |
| T2-T3 | SD-RSRP range 2 |
| ... | ... |

As shown in Table 2, the narrow-band resource pool for the electronic device 300 receiving the discovery response message is numbered as 1. Further, T1, T2, and T3 represent boundaries of the time for carrying the discovery information determined by the processing circuit 310. Further, the time period T1-T2 corresponds to the SD-RSRP range 1, and the time period T2-T3 corresponds to the SD-RSRP range 2 and the like. Only an example of representing a frequency resource by using the number of a narrow-band resource pool is shown here, however, the frequency resource may be represented in other ways.

Further, according to an embodiment of the present disclosure, the discovery request message transmitted by the electronic device 300 may further include type information for indicating a type of the electronic device 300. Here, as described above, the type of the electronic device 300 may be determined according to whether the electronic device 300 has a capability of receiving downlink data through the side link, such as the first type (type 1) and the second type (type 2) as described above. In this way, the relay device that receives the discovery request message may determine the type of the electronic device 300 that transmits the discovery request message.

Next, the transceiver circuit 220 of the electronic device 200 serving as a relay device may receive resource indication information for indicating a resource carrying discovery information, and the processing circuit 210 may determine, according to the resource indication information, information associated with the resource carrying discovery information. Here, the electronic device 200 receives the resource indication information from the electronic device 300 serving as a remote device, and the resource indication information is used to indicate a resource for the electronic device 300 receiving the discovery information. For example, the transceiver circuit 220 may receive the resource indication information through the discovery request message.

According to the embodiment of the present disclosure, the processing circuit 210 may determine a resource for the electronic device 200 transmitting the discovery information according to the resource indication information. That is, the information associated with the resource carrying discovery information refers to a frequency resource for transmitting the discovery information (specifically, a discovery response message).

According to the embodiment of the present disclosure, the processing circuit 210 may use the resource for the electronic device 300 receiving the discovery information indicated in the resource indication information as a resource for transmitting the discovery information. Here, in a discovery period, the electronic device 200 may receive the resource indication information from multiple remote devices, and thus the resource for transmitting the discovery information determined by the electronic device 200 may include multiple resources.

According to the embodiment of the present disclosure, the resource indication information may further indicate a relationship between the resource for the electronic device 300 receiving the discovery information and discovery reference signal received power RSRP information regarding the electronic device 300 measured by the electronic device 200 serving as a relay device. Further, the processing circuit 210 may further determine, according to the resource indication information, a time resource for the electronic device 200 transmitting the discovery information. That is, the information associated with the resource carrying discovery information refers to a time resource for transmitting the discovery information (specifically, a discovery response message).

For example, in a case that the electronic device 200 receives information as shown in Table 2, the processing circuit 210 may measure the discovery reference signal received power SD-RSRP received from the electronic device 300, and determine, according to the SD-RSRP and the information shown in Table 2, the time and frequency resource for transmitting the discovery response message. First, it is determined according to the information shown in Table 2 that the discovery response message is transmitted by using the narrow-band resource pool numbered as 1. Next, assuming that the SD-RSRP determined by the processing circuit 210 is within the SD-RSRP range 1, it may be determined that the discovery response message is transmitted within the time period T1-T2. Thus, the electronic device 200 determines the frequency resource and the time resource for transmitting the discovery response message.

According to the embodiment of the present disclosure, a resource carrying discovery information is mapped to the SD-RSRP, such that different relay devices transmit discovery information using different time resources, thereby preventing the remote device from monitoring too many discovery messages on the same resource at the same time, thus reducing the interference. Further, according to the embodiment of the present disclosure, if a resource allocation manner of type 2B is adopted, that is, resources are semi-statically allocated by a network side device, the electronic device 200, in a case of receiving the discovery request message from the electronic device 300, also needs to report to the network side device to request for a resource, and the network side device replies to the resource allocation information. If a resource allocation manner of the type 1 is adopted, that is, the terminal device selects a resource by itself, the electronic device 200 does not need to report to the network side device in a case of receiving the discovery request message from the electronic device 300.

According to the embodiment of the present disclosure, the discovery request information received by the electronic device 200 may further include type information for indicating a type of the electronic device 300. Further, the processing circuit 210 may determine the type of the electronic device 300 according to the type information. In addition, in a case that the electronic device 300 is a remote device of the first type, it has the capability of receiving downlink data through the side link, thus the electronic device 200 may transmit the discovery response message to the electronic device 300. In a case that the electronic device 300 is a remote device of the second type, it does not have the capability of receiving downlink data through the side link, thus the electronic device 200 needs to transmit the discovery response message to the network side device.

Figure 12:
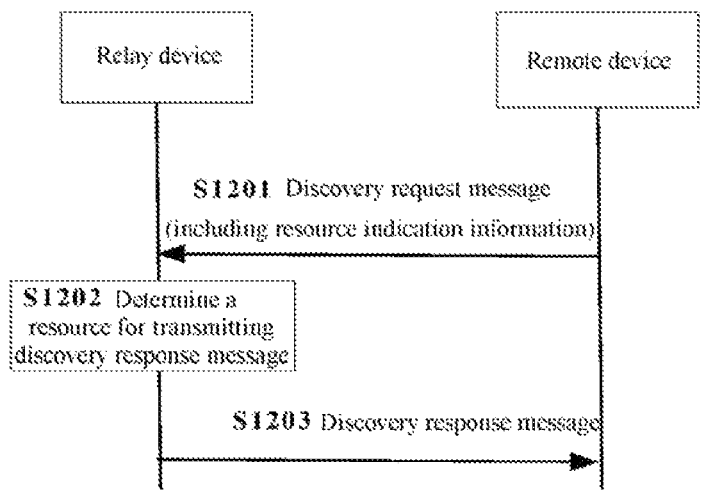
FIG. 12 is a schematic diagram showing a signaling flow according to a fifth embodiment of the present disclosure.

FIG. 12 is a schematic diagram showing a signaling flow according to the fifth embodiment of the present disclosure. As shown in FIG. 12, in step S1201, the remote device transmits a discovery request message to the relay device, and the discovery request message includes the resource indication information. Next, in step S1202, the relay device determines a resource for transmitting the discovery information according to the resource indication information. Next, in step S1203, the relay device transmits the discovery response message to the remote device by using the determined resource.

As described above, according to the fifth embodiment of the present disclosure, the relay device may inform the remote device of the resource for transmitting the discovery information, or the remote device may notify the relay device of the resource for receiving the discovery information. In this way, the resource for the remote device monitoring the discovery information is the resource for the relay device transmitting the discovery information, such that the remote device can successfully receive the discovery information, thereby shortening the time period of the discovery process, and saving the energy of the remote device and the relay device.

Sixth Embodiment

In the embodiment, the electronic device 200 serving as a relay device transmits resource indication information to the electronic device 300 serving as a remote device. The electronic device 300 herein may be a remote device of the first type as described above.

According to the embodiment of the present disclosure, the processing circuit 210 of the electronic device 200 may generate resource indication information for indicating a resource carrying discovery information.

According to the embodiment of the present disclosure, the transceiver circuit 220 of the electronic device 200 may transmit the resource indication information.

According to the embodiment of the present disclosure, the resource indication information may indicate a priority of each resource carrying discovery information in the resource pool. As described above, the resource carrying discovery information may be represented in various manners, such as time-frequency resource information, the number of a narrow-band resource pool, and the number of a resource set.

Here, processing circuit 210 may determine the priority of each resource according to various implementations. For example, the processing circuit 210 may detect a received power of each resource carrying discovery information in the resource pool, and determine the priority of each resource carrying discovery information according to the received power. Specifically, the processing circuit 210 may determine that the resource with a small received power has a low priority. In addition, the transceiver circuit 220 may also receive discovery information, such as a discovery response message, from another surrounding relay device, and determine the priority of each resource based on the received discovery information. For example, the electronic device 200 may also determine the priority of each resource by interacting the resource indication information with other surrounding relay devices.

According to the embodiment of the present disclosure, in a case that the processing circuit 210 generates the resource indication information for indicating the priority of each resource carrying discovery information, the transceiver circuit 220 may transmit the resource indicates information to a remote device performing D2D communication with the electronic device 200. Preferably, the transceiver circuit 220 may periodically transmit the resource indication information to the remote device performing D2D communication with the electronic device 200. Here, the electronic device 200 has established D2D-connection with one or more electronic devices 300 serving as remote devices, such that the electronic device 200 may transmit the resource indication information to the electronic devices 300 establishing the D2D connection. In addition, the transceiver circuit 220 may also transmit the resource indication information to electronic devices 300 not establishing the D2D connection with the electronic device 200. For example, the electronic device 200 may carry the resource indication information through the discovery response message, the discovery announcement message, the synchronization message, and the like as described above, to assist the electronic device 300 in selecting a resource for receiving the discovery information.

According to the embodiment of the present disclosure, the transceiver circuit 320 of the electronic device 300 serving as a remote device may receive the resource indication information for indicating the resource carrying discovery information as described above, and the processing circuit 310 may determine, according to the resource indication information, information associated with the resource carrying discovery information.

Here, the electronic device 300 may receive the above resource indication information from the electronic device 200 serving as a relay device. Preferably, the electronic device 300 may receive the resource indication information from the electronic device 200 serving as a relay device performing D2D communication with the electronic device 300, where the resource indication information is used to indicate a priority of each resource carrying discovery information in the resource pool.

According to the embodiment of the present disclosure, the processing circuit 310 may determine, according to the resource indication information, a resource for the electronic device 300 receiving the discovery information. That is, the information associated with the resource carrying discovery information refers to a resource for receiving the discovery information. Here, the resource for receiving the discovery information refers to a resource for the electronic device 300 receiving the discovery information in a next discovery period.

According to the embodiment of the present disclosure, the processing circuit 310 may preferentially select a resource having a high priority indicated in the resource indication information as a resource for receiving the discovery information.

Figure 13:
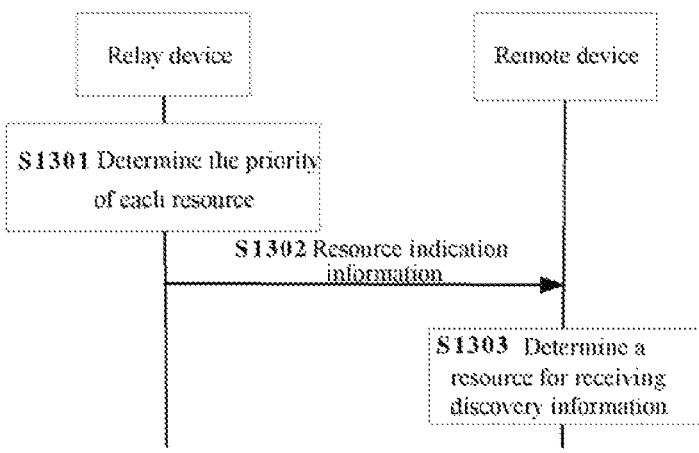
FIG. 13 is a schematic diagram showing a signaling flow according to a sixth embodiment of the present disclosure.

FIG. 13 is a schematic diagram showing a signaling flow according to the sixth embodiment of the present disclosure. As shown in FIG. 13, in step S1301, the relay device determines the priority of each resource carrying discovery information in the resource pool. Next, in step S1302, the relay device transmits the resource indication information to a remote device performing D2D communication with the relay device. Next, in step S1303, the remote device determines the resource for receiving the discovery information by using the resource indication information.

As described above, according to the sixth embodiment of the present disclosure, the relay device may inform the remote device of the priority of each resource. In this way, the remote device may selectively monitor the resource pool, thereby effectively reducing the number of resources that the remote device needs to monitor, thus shortening the time period of the discovery process, and saving the energy of the remote device and the relay device.

Seventh Embodiment

In the embodiment, the electronic device 200 serving as a relay device has performed the discovery process and established a D2D connection with one or more electronic devices 300 serving as remote devices. Here, the discovery process may be performed in any ways described above. Further, the electronic device 300 herein may be a remote device of the first type as described above.

According to the embodiment of the present disclosure, in a case that the electronic device 200 serving as a relay device has established a D2D connection with one or more electronic devices 300 serving as remote devices, the electronic device 300 still needs to receive the discovery information from other relay devices for use in a relay reselection process. In this case, according to the embodiment of the present disclosure, the electronic device 200 may receive the discovery information from other relay devices, and then packages and forwards the discovery information to the electronic device 300. The discovery information herein may include a discovery response message. In this way, since the electronic device 200 may receive the discovery information on the full frequency band, the collision of the discovery information from the different relay devices is reduced.

According to the embodiment of the present disclosure, if the electronic device 200 detect that its link with the electronic device 300 is relatively stable, or the electronic device 300 detects that its link with the electronic device 200 is relatively stable, or the electronic device 300 detects that the power is insufficient, the electronic device 200 may be requested to forward the discovery information of other relay devices. That is, an entity that initiates the above process may be the electronic device 200 serving as a relay device or the electronic device 300 serving as a remote device.

According to the embodiment of the present disclosure, the transceiver circuit 320 of the electronic device 300 may transmit an assistance measurement configuration request message to the electronic device 200 performing D2D communication with the electronic device 300 to request that the electronic device 200 receives and forwards the discovery information of other relay device.

According to the embodiment of the present disclosure, the transceiver circuit 220 of the electronic device 200 may receive an assistance measurement configuration request message from the electronic device 300 performing D2D communication with the electronic device 200, and forward the assistance measurement configuration request message to a network side device that provides a service to the electronic device 200. Further, the transceiver circuit 220 may further receive an assistance measurement configuration message from the network side device, and the assistance measurement configuration message includes a resource configured for the electronic device 200 to forward the discovery information of the other relay devices to the electronic device 300. Next, the electronic device 200 may forward discovery message of the other relay devices by using the resource configured in the assistance measurement configuration message. Further, the transceiver circuit 220 may forward the assistance measurement configuration information to the remote device.

According to the embodiment of the present disclosure, the transceiver circuit 320 of the electronic device 300 may receive an assistance measurement configuration message from the electronic device 200 and monitor on a resource configured in the assistance measurement configuration message to receive the discovery information. Specifically, the electronic device 300 may periodically monitor on the resource configured in the assistance measurement configuration message.

As described above, the assistance measurement configuration is triggered by the electronic device 300, and the resource is configured by the network side device. According to the embodiment of the present disclosure, the resource may also be configured by the electronic device 200 serving as a relay device. That is, in a case that the transceiver circuit 220 receives the assistance measurement configuration request message from the electronic device 300 performing D2D communication with the electronic device 200, the processing circuit 210 may determine a resource for forwarding the discovery information from the other relay device to the electronic device 300. Next, the electronic device 200 may forward the discovery message of the other relay device by using the resource configured in the assistance measurement configuration message. Further, the transceiver circuit 220 may also transmit an assistance measurement configuration message including the configured resource to the electronic device 300.

According to the embodiment of the present disclosure, an entity that triggers the assistance measurement configuration may also be the electronic device 200. For example, the transceiver circuit 220 may transmit an assistance measurement configuration request message to the network side device, and receive an assistance measurement configuration message from the network side device. Next, the transceiver circuit 220 may forward the assistance measurement configuration message to the electronic device 300. In addition, the electronic device 200 may also directly trigger the assistance measurement configuration and configure a resource for forwarding discovery information from other relay devices to the electronic device 300. That is, the transceiver circuit 220 may transmit an assistance measurement configuration message directly to the electronic device 300.

Figure 14:
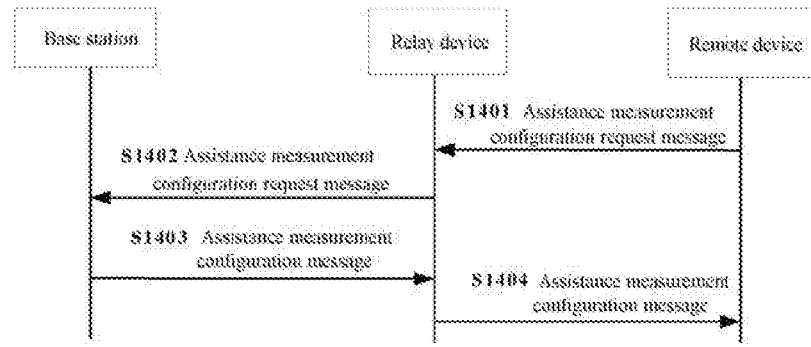
FIG. 14 is a schematic diagram showing a signaling flow according to a seventh embodiment of the present disclosure.

FIG. 14 is a schematic diagram showing a signaling flow according to the seventh embodiment of the present disclosure. As shown in FIG. 14, in step S1401, a remote device transmits an assistance measurement configuration request message to the relay device. Next, in step S1402, the relay device forwards the assistance measurement configuration request message to the base station. Next, in step S1403, the base station transmits an assistance measurement configuration message to the relay device. Next, in step S1404, the relay device forwards the assistance measurement configuration message to the remote device. Here, FIG. 14 only shows an example in which a resource is triggered by a remote device and configured by a base station, in practice, the resource may also be triggered by a remote device and configured by a relay device, triggered and configured by the relay device, and triggered by the relay device and configured by the base station.

According to the embodiment of the present disclosure, in a case that the relay device and the remote device performing D2D communication with the relay device configure the assistance measurement configuration as described above, the relay device may forward discovery information of another relay device on the configured resource, and the remote device may periodically monitor the discovery information packaged and transmitted by the relay device which performs D2D communication with the remote device on the configured resource.

According to the embodiment of the present disclosure, in a case that the electronic device 300 and the relay device which performs the D2D communication with the electronic device 300 configure the assistance measurement configuration, the transceiver circuit 320 may broadcast and transmit a discovery request message, where the discovery request message includes information for indicating transmission of a discovery response message corresponding to the discovery request message to the relay device performing D2D communication with the electronic device 300.

According to the embodiment of the present disclosure, the discovery request message may further include identification information of the relay device performing D2D communication with the electronic device 300, for example, identification (ID) information of the relay device.

According to the embodiment of the present disclosure, in a case that the relay device receives the discovery request message from the electronic device 300, the relay device may determine, according to the discovery request message, that it is required to transmit the discovery response message to the relay device performing D2D communication with the electronic device 300, and determine, according to the identification information of the relay device included in the discovery request message, the relay device to which the discovery response message needs to be transmitted. Therefore, the relay device that receives the discovery request message may transmit the discovery response message to the relay device performing D2D communication with the electronic device 300 according to the discovery request message.

According to the embodiment of the present disclosure, the discovery response message transmitted by the other relay device may include identification information of the electronic device 300, for the electronic device 200 to determine a destination device of the discovery response message.

According to the embodiment of the present disclosure, the transceiver circuit 220 of the electronic device 200 performing D2D communication with the electronic device 300 may receive a discovery response message from a relay device other than the electronic device 200. Further, the electronic device 200 may package and transmit the discovery response message of the destination device belonging to the same remote device to the remote device on the resource configured as described above at a suitable time. For example, the electronic device 200 may periodically transmit the packaged discovery response message to the remote device, or the electronic device 200 transmits the packaged discovery response message to the remote device in a case that the number of the discovery response message reaches a certain value, which is not limited in the present disclosure.

According to the embodiment of the present disclosure, the discovery response message transmitted by the other relay device may further include discovery reference signal received power RSRP information regarding the electronic device 300 measured by the other relay device. The discovery RSRP information herein refers to the reference power received power received from the electronic device 300 measured by the other relay device, that is, SD-RSRP information.

According to the embodiment of the present disclosure, the electronic device 200 performing D2D communication with the electronic device 300 may forward a discovery response message including the SD-RSRP information to the electronic device 300. Since the SD-RSRP information reflects a distance of another relay device from the electronic device 300 to some extent, the electronic device 300 may perform a relay reselection process according to the SD-RSRP information from different relay devices.

According to the embodiment of the present disclosure, the electronic device 200 performing D2D communication with the electronic device 300 may also not package and transmit the discovery response message to the electronic device 300, but determine optimal one or more other relay devices according to the SD-RSRP carried in the discovery response message and inform the electronic device 300 of the identities of the optimal one or more other relay devices. Next, the electronic device 300 may perform a relay reselection process according to information received from the electronic device 200.

Figure 15:
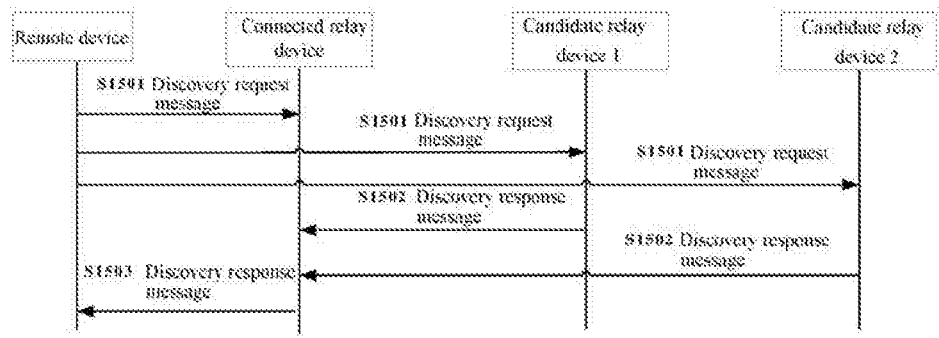
FIG. 15 is a schematic diagram showing a signaling flow according to a seventh embodiment of the present disclosure.

FIG. 15 is a schematic diagram showing a signaling flow according to the seventh embodiment of the present disclosure. As shown in FIG. 15, in step S1501, the remote device broadcasts and transmits a discovery request message, such that a relay device performing D2D connection with the remote device and a candidate relay device 1 and a candidate relay device 2 can receive the discovery request message. The discovery request message carries information for indicating transmission of the discovery response message corresponding to the discovery request message to a relay device performing D2D communication with the electronic device 300 and the identification information of the relay device. Next, in step S1502, the candidate relay device 1 and the candidate relay device 2 transmit the discovery response message to the connected relay device. Next, in step S1503, the connected relay device packages and transmits the discovery response message to the remote device at an appropriate timing.

As described above, according to the seventh embodiment of the present disclosure, the relay device performing the D2D connection with the remote device may receive the discovery information from the other relay device, and then package and transmit all the discovery information to the remote device. In this way, since the relay device may receive the discovery information on the full frequency band, the collision of the discovery information of different relay devices is reduced. In addition, since the remote device only needs to monitor the discovery response message on the resource configured in the assistance measurement configuration, thereby reducing the resource that the remote device needs to monitor, thus shortening the time period of the discovery process, and saving the energy of the remote device and the relay device.

Eighth Embodiment

In this embodiment, the electronic device 200 serving as a relay device has performed the discovery process and established D2D connection with one or more electronic devices 300 serving as remote devices. Here, the discovery process may be performed in any ways as described above. Further, the electronic device 300 herein may be a remote device of the second type as described above.

The eighth embodiment described in the present disclosure is similar to the seventh embodiment, since the electronic device 300 does not have the capability of receiving downlink data through the side link, in a case that the electronic device 200 establishing D2D connection with the electronic device 300 receives the discovery response message from other relay devices, the electronic device 200 needs to package and transmit the discovery response message to the network side device that provides a service to the electronic device 200, and the network side device forwards the packaged discovery response message to the electronic device 300. Therefore, all implementations in the seventh embodiment regarding configuring the assistance measurement configuration, the electronic device 300 transmitting the discovery request message, the electronic device 200 receiving the discovery response message from other relay devices, and the electronic device 200 generating the packaged discovery response message are all applicable to the eighth embodiment.

According to the embodiment of the present disclosure, the electronic device 200 may package and transmit the discovery response message of destination devices belonging to the same remote device at a suitable time on the resource configured as described above to a network side device that provides a service to the electronic device 200, for example, the electronic device 400. For example, the electronic device 200 may periodically transmit the packaged discovery response message to the network side device, or the electronic device 200 transmits the packaged discovery response message to the network side device in a case that the number of the discovery response message reaches a certain value, which is not limited in the present disclosure. Next, the network side device may forward the packaged discovery response message to the electronic device 200.

According to the embodiment of the present disclosure, the electronic device 200 performing D2D communication with the electronic device 300 may forward a discovery response message including SD-RSRP information to the electronic device 300 through the network side device. Next, the electronic device 300 may perform a relay reselection process according to the SD-RSRP information from different relay devices.

According to the embodiment of the present disclosure, the electronic device 200 performing D2D communication with the electronic device 300 may also not package and transmit the discovery response message to the network side device, but determine optimal one or more other relay devices according to the SD-RSRP carried in the discovery response message, and notify identifiers of the optimal one or more other relay devices to the network side device, for the network side device to forward the identifiers of the optimal one or more other relay devices to the electronic device 300. Next, the electronic device 300 may perform a relay reselection process according to information received from the electronic device 200.

Figure 16:
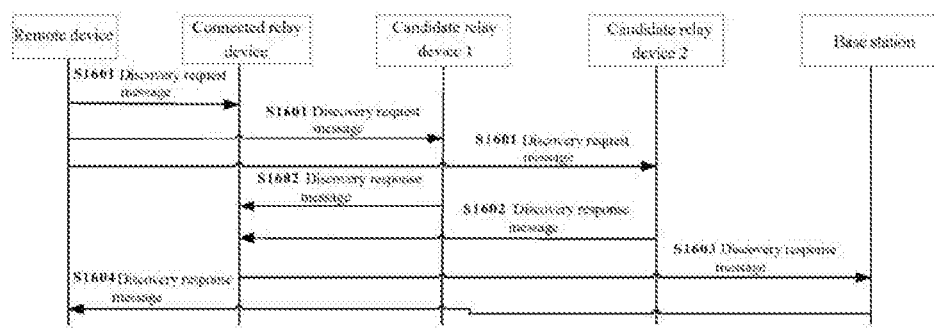
FIG. 16 is a schematic diagram showing a signaling flow according to an eighth embodiment of the present disclosure.

FIG. 16 is a schematic diagram showing a signaling flow according to the eighth embodiment of the present disclosure. As shown in FIG. 16, in step S1601, the remote device broadcasts and transmits discovery request message, such that a relay device performing D2D connection with the remote device and a candidate relay device 1 and a candidate relay device 2 can receive the discovery request message. The discovery request message carries information for indicating transmission of the discovery response message corresponding to the discovery request message to the relay device performing D2D communication with the electronic device 300 and the identification information of the relay device. Next, in step S1602, the candidate relay device 1 and the candidate relay device 2 transmit a discovery response message to the connected relay device. Next, in step S1603, the connected relay device packages and transmits the discovery response message to the base station at an appropriate timing. Next, in step S1604, the base station forwards the packaged discovery response message to the remote device.

As described above, according to the eighth embodiment of the present disclosure, the relay device performing D2D connection with the remote device may receive the discovery information from the other relay devices, and then package and forward all the discovery information to the network side device. In this way, since the relay device can receive the discovery information on the full frequency band, the collision of the discovery information of different relay devices is reduced. Further, the other relay devices do not need to separately report the discovery response message to the network side device, thereby saving uplink signaling overhead and saving energy of other relay devices.

Ninth Embodiment

In the embodiment, an electronic device according to another embodiment of the present disclosure is described. The electronic device herein may be an electronic device 400 serving as a network side device.

According to the embodiment of the present disclosure, the transceiver circuit 420 of the electronic device 400 may transmit information regarding groups divided according to the history information of the connection relation between the relay device and the remote device to the relay device and the remote device within the service range of the electronic device 400. Further, the transceiver circuit 420 may also receive request information of a group-based discovery process from the relay device or the remote device within the service range of the electronic device 400.

Further, the processing circuit 410 of the electronic device 400 may also determine whether the relay device or the remote device can perform the group-based discovery process.

According to the embodiment of the present disclosure, a ProSe function entity in a wireless communication network may divide terminal devices having a trust relationship into the same group. That is, the relay device and the remote device may be grouped such that any two terminal devices in the same group have a trust relationship. In addition, the ProSe function entity may further group the terminal devices according to other principles. For example, for a terminal device, in a case that the number of terminal devices in a group having a trust relationship with the terminal device exceeds a certain threshold, the terminal device may be divided into this group and the like, the principle of grouping is not limited in the present disclosure.

According to the embodiment of the present disclosure, a terminal device having a trust relationship may be determined according to history information of a connection relation between terminal devices (including a relay device and a remote device). Specifically, it may be determined that a pair of terminal devices that have a connection relation therebetween have a trust relationship.

According to the embodiment of the present disclosure, in a case that the ProSe function entity performs the grouping, the group information may be determined. The group information of each group includes identification information of the terminal devices included in the group. Next, the ProSe function entity may transmit the group information to the terminal device included in the group through the PC3 interface.

According to the embodiment of the present disclosure, the transceiver circuit 420 of the electronic device 400 may periodically broadcast and transmit the group information, and the group information may include information such as information of terminal devices included in the group, a discovery model of the group, and discovery resources of the group, such that the terminal device within the coverage of the electronic device 400 may obtain information regarding the group in which the terminal device is located.

Figure 17:
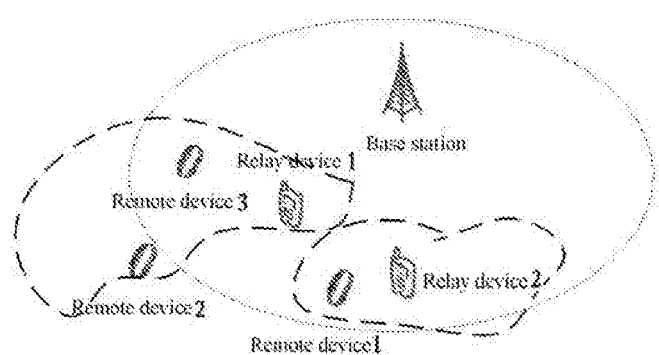
FIG. 17 is a schematic diagram showing grouping of terminal devices according to a ninth embodiment of the present disclosure.

FIG. 17 is a schematic diagram showing grouping of terminal devices according to the ninth embodiment of the present disclosure. As shown in FIG. 17, a relay device 1, a remote device 3, and a remote device 2 are divided into the same group, and a relay device 2 and a remote device 1 are divided into the same group.

According to the embodiment of the present disclosure, a terminal device within the coverage of the electronic device 400 may transmit request information of a group-based discovery process to the electronic device 400. In a case of receiving such request information, the electronic device 400 may determine whether the terminal device that transmits the request can perform the group-based discovery process. Specifically, the electronic device 400 may transmit an inspection request to an Mobility Management Entity (MME) or an Home Subscriber Server (HSS) to confirm whether the group message is established. In a case that the electronic device 400 receives an inspection response indicating that the group message is established from the MME or the HSS, it may be determined that the terminal device that transmits the request may perform the group-based discovery process. In this case, the electronic device 400 needs to update the group information and broadcast and transmit the updated group information.

Further, according to the embodiment of the present disclosure, the terminal device within the coverage of the electronic device 400 may also transmit request information for stopping the group-based discovery process to the electronic device 400. In a case of receiving such request information, the electronic device 400 also needs to update the group information and broadcast and transmit the updated group information.

Figure 18:
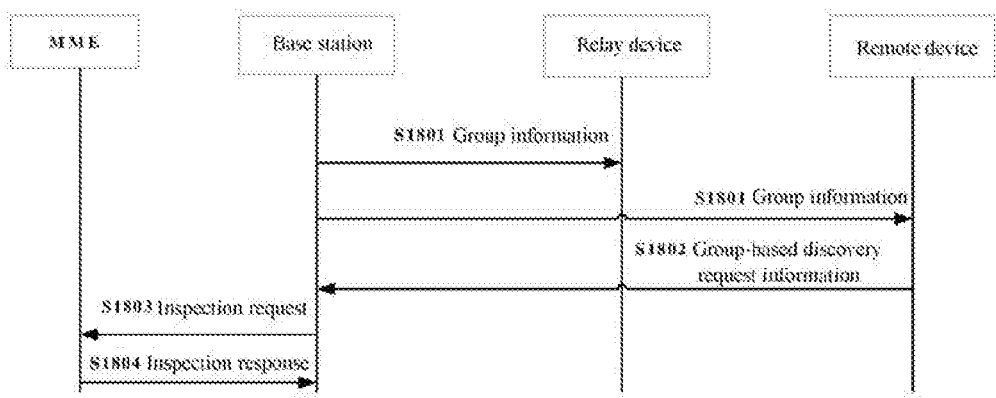
FIG. 18 is a schematic diagram showing a signaling flow according to a ninth embodiment of the present disclosure.

FIG. 18 is a schematic diagram showing a signaling flow according to the ninth embodiment of the present disclosure. As shown in FIG. 18, in step S1801, the base station broadcasts and transmits group information, such that the remote device and the relay device within the coverage of the base station can receive such group information. Next, in step S1802, the remote device transmits group-based discovery request information to the base station. Next, in step S1803, the base station transmits an inspection request to the MME. Next, in step S1804, the MME returns an inspection response to the base station.

As described above, according to the ninth embodiment of the present disclosure, the terminal devices may be grouped according to the trust relationship of the terminal devices. In this way, the terminal devices with the trust relationship may skip the authentication process when establishing the connection relation, thereby speeding up the connection establishment.

<Wireless Communication Method>

Next, a wireless communication method performed by an electronic device in a wireless communication system according to an embodiment of the present disclosure is described in detail. The electronic device herein may be a device that transits resource indication information, that is, a terminal device in a wireless communication system, or a network side device in a wireless communication system. For example, the method may be performed by the electronic device 200, the electronic device 300 and the electronic device 400 as described above, and thus all of the embodiments regarding the electronic device 200, the electronic device 300, and the electronic device 400 are applicable thereto.

Figure 19:
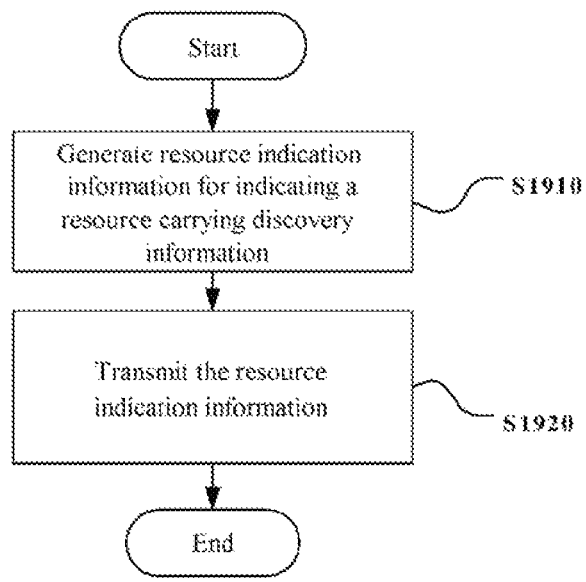
FIG. 19 is a flowchart showing a wireless communication method performed by an electronic device according to an embodiment of the present disclosure.

FIG. 19 is a flowchart showing a wireless communication method performed by an electronic device according to an embodiment of the present disclosure.

As shown in FIG. 19, in step S1910, resource indication information for indicating a resource carrying discovery information is generated.

Next, in step S1920, the resource indication information is transmitted.

Preferably, the electronic device is a terminal device serving as a relay device, and the resource indication information is used to indicate the resource for the electronic device transmitting the discovery information.

Preferably, the method further includes: periodically transmitting the resource indication information to a network side device that provides a service the electronic device.

Preferably, the method further includes: transmitting the resource indication information to a terminal device serving as a remote device.

Preferably, the method further includes: transmitting resource indication information to the remote device through a synchronization message.

Preferably, the method further includes: transmitting the resource indication information to the remote device through a discovery announcement message.

Preferably, the method further includes: receiving a discovery response message from another relay device other than the electronic device, where the discovery response message includes identification information of a remote device performing device-to-device D2D communication with the electronic device.

Preferably, the discovery response message further includes discovery reference signal received power RSRP information regarding the remote device measured by another relay device.

Preferably, the method further includes: transmitting a discovery response message to the remote device.

Preferably, the method further includes: transmitting the discovery response message to the network side device that provides a service to the electronic device.

Preferably, the electronic device is a terminal device serving as a relay device, and the resource indication information is used to indicate the priority of each resource carrying discovery information in the resource pool.

Preferably, the method further includes: periodically transmitting the resource indication information to the remote device performing device-to-device D2D communication with the electronic device.

Preferably, the electronic device is a terminal device serving as a remote device, and the resource indication information is used to indicate a resource for the remote device receiving the discovery information.

Preferably, the method further includes: periodically transmitting the resource indication information to the network side device that provides a service for the electronic device.

Preferably, the method further includes: transmitting the resource indication information to the terminal device serving as a relay device.

Preferably, the method further includes: transmitting the resource indication information to the relay device through the synchronization message.

Preferably, the method further includes: transmitting the resource indication information to the relay device through the discovery request message.

Preferably, the resource indication information is further used to indicate a relationship between a resource for the remote device receiving the discovery information and discovery reference signal received power RSRP information regarding the remote device measured by the relay device.

Preferably, the method further includes: broadcasting and transmitting a discovery request message. The discovery request message includes information for indicating transmission of a discovery response message corresponding to the discovery response message to the relay device performing device-to-device D2D communication with the electronic device.

Preferably, the electronic device is a network side device, and the resource indication information is used to indicate a relationship between each resource carrying discovery information in the resource pool and a position of a terminal device that transmits or receives the discovery information.

Preferably, the resource indication information further indicates a narrow-band resource.

Next, a wireless communication method performed by an electronic device in a wireless communication system according to another embodiment of the present disclosure is described in detail. The electronic device herein may be a device that receives resource indication information, that is, a terminal device in a wireless communication system, or a network side device in a wireless communication system, for example, the method may be performed by the electronic device 200, the electronic device 300 and the electronic device 400 as described above, and thus all of the embodiments regarding the electronic device 200, the electronic device 300, and the electronic device 400 are applicable thereto.

Figure 20:
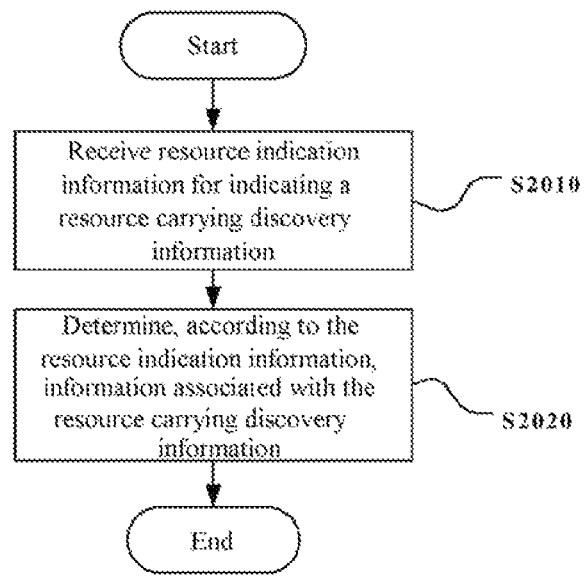
FIG. 20 is a flowchart showing a wireless communication method performed by an electronic device according to another embodiment of the present disclosure.

FIG. 20 is a flowchart showing a wireless communication method performed by an electronic device according to another embodiment of the present disclosure.

As shown in FIG. 20, in step S2010, resource indication information for indicating a resource carrying discovery information is received.

Next, in step S2020, information associated with a resource carrying discovery information is determined according to the resource indication information.

Preferably, the electronic device is a network side device, and the method further includes: receiving, from a terminal device serving as a relay device in the coverage of the electronic device, resource indication information for indicating a resource for the relay device transmitting the discovery information, or receiving, from a terminal device serving as a remote device within the coverage of the electronic device, resource indication information for indicating a resource for the remote device receiving the discovery information.

Preferably, the method further includes: determining, according to the resource indication information, a priority of each resource carrying discovery information in a resource pool.

Preferably, the electronic device is a terminal device serving as a relay device.

Preferably, the method further includes: receiving the resource indication information from a network side device that provides a service to the electronic device, where the resource indication information is used to indicate a relationship between each resource carrying discovery information in the resource pool and a position of the electronic device.

Preferably, the method further includes: determining, according to the position of the electronic device, a range of device-to-device D2D communication of the electronic device, and the resource indication information, a resource for the electronic device transmitting the discovery information.

Preferably, the method further includes: receiving the resource indication information from the terminal device serving as a remote device, where the resource indication information is used to indicate a resource for the remote device receiving the discovery information.

Preferably, the method further includes: determining, according to the resource indication information, a resource for the electronic device transmitting the discovery information.

Preferably, the method further includes: receiving the resource indication information through a synchronization message.

Preferably, the method further includes: receiving the resource indication information through a discovery request message.

Preferably, the resource indication information is further used to indicate a relationship between a resource for the remote device receiving the discovery information and a discovery reference signal received power RSRP information regarding the remote device measured by the relay device.

Preferably, the electronic device is a terminal device serving as a remote device.

Preferably, the method further includes: receiving the resource indication information from the network side device that provides a service to the electronic device, where the resource indication information is used to indicate a relationship between each resource carrying discovery information in the resource pool and a position of the electronic device.

Preferably, the method further includes: determining, according to the position of the electronic device and the resource indication information, a resource for the electronic device receiving the discovery information.

Preferably, the method further includes: receiving the resource indication information from the terminal device serving as a relay device, where the resource indication information is used to indicate a resource for the relay device transmitting the discovery information.

Preferably, the method further includes: determining, according to the resource indication information, the resource for the electronic device receiving the discovery information.

Preferably, the method further includes: receiving the resource indication information through a synchronization message.

Preferably, the method further includes: receiving the resource indication information through a discovery announcement message.

Preferably, the method further includes: receiving the resource indication information from a relay device performing device-to-device D2D communication with the electronic device, where the resource indication information is used to indicate a priority of each resource carrying discovery information in a resource pool.

Preferably, the method further includes: determining, according to the resource indication information, a resource for the electronic device receiving the discovery information.

Next, a wireless communication method performed by an electronic device in a wireless communication system according to another embodiment of the present disclosure is described in detail. The electronic device herein may be a network side device in a wireless communication system, and thus all implementations regarding the electronic device 400 in the ninth embodiment are applicable thereto.

Figure 21:
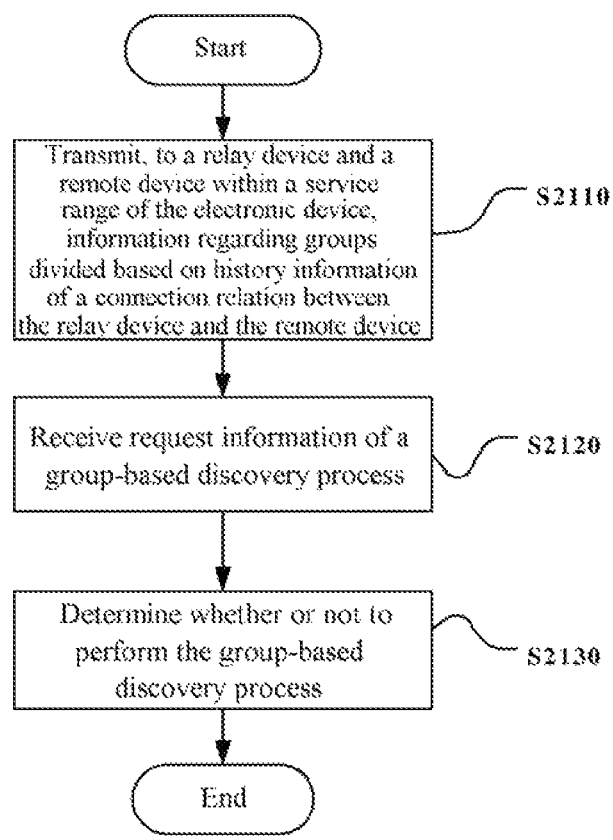
FIG. 21 is a flowchart showing a wireless communication method performed by an electronic device according to another embodiment of the present disclosure.

FIG. 21 is a flowchart showing a wireless communication method performed by an electronic device according to another embodiment of the present disclosure.

As shown in FIG. 21, in step S2110, information regarding groups divided according to history information of a connection relation between the relay device and the remote device is transmitted to the relay device and the remote device within the service range of the electronic device.

Next, in step S2120, the request information of the group-based discovery process is received from the relay device or the remote device within the service range of the electronic device.

Next, in step S2130, it is determined whether the relay device or the remote device is capable of performing the group-based discovery process.

<Application Example>

The technology of the present disclosure may be applied to various products. For example, the network side device may be implemented as a base station. The base station may be implemented as any type of eNB, such as a macro eNB and a small eNB. The base station may further be implemented as any type of gNB. The small eNB may be an eNB covering a cell smaller than a macro cell, such as a pico eNB, a micro eNB or a home (femto) eNB. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of terminals, which will be described below, may each operate as the base station by temporarily or semi-persistently executing a base station function.

For example, the terminal devices serving as a remote device and a relay device may be implemented as a mobile terminal (such as a smart phone, a tablet personal computer (PC), a notebook PC, a portable game terminal and a portable/dongle mobile router and a digital camera) or an in-vehicle terminal (such as an automobile navigation device). In particular, a terminal device serving as a remote device may be implemented as a wearable device, and a terminal device serving as a relay device may be implemented as a mobile terminal that is very close to the wearable device. The terminal device may also be implemented as a terminal (that is also referred to as a machine type communication (MTC) terminal) performing machine-to-machine (M2M) communication. Furthermore, the terminal device may be a wireless communication module (such as an integrated circuit module including a single die) mounted on each of the terminals.

[Application Example Regarding Base Station]

FIRST APPLICATION EXAMPLE

Figure 22:
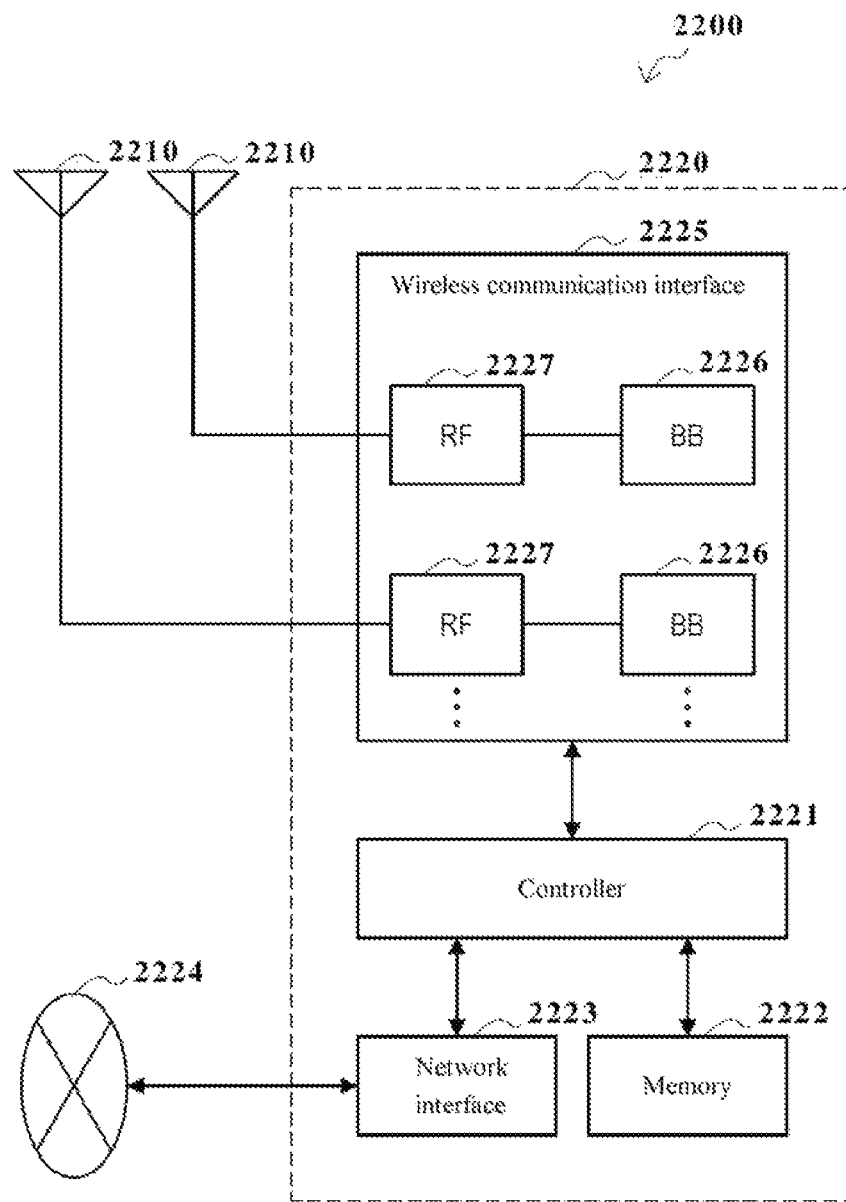
FIG. 22 is a block diagram showing a first example of a schematic configuration of an evolved Node B (eNB)

FIG. 22 is a block diagram showing a first example of a schematic configuration of an eNB to which the technique of the present disclosure can be applied. The eNB 2200 includes one or more antennas 2210 and a base station device 2220. The base station device 2220 and each of the antennas 2210 may be connected with each other via a RF cable.

Each of the antennas 2210 includes a single or multiple antenna elements (such as multiple antenna elements included in a multiple-input multiple-output (MIMO) antenna), and are used to transmit and receive a wireless signal by the base station device 2220. The eNB 2200 may include the multiple antennas 2210, as shown in FIG. 22. For example, the multiple antennas 2210 may be compatible with multiple frequency bands used by the eNB 2200. Although the eNB 2200 including multiple antennas 2210 is shown in FIG. 22, the eNB 2200 may also include a single antenna 2210.

The base station device 2220 includes a controller 2221, a memory 2222, a network interface 2223, and a wireless communication interface 2225.

The controller 2221 may be, for example, a CPU or a DSP, and operates various functions of a higher layer of the base station device 2220. For example, the controller 2221 generates a data packet based on data in a signal processed by the wireless communication interface 2225, and transfers the generated packet via a network interface 2223. The controller 2221 may bundle data from multiple baseband processors to generate bundled packet, and transfer the generated bundled packet. The controller 2221 may have logical functions of performing control such as radio resource control, radio bearer control, mobility management, admission control, and scheduling. The control may be performed in conjunction with an adjacent eNB or a core network node. The memory 2222 includes RAM and ROM, and stores a program that is executed by the controller 2221, and various types of control data (such as a terminal list, transmission power data, and scheduling data).

The network interface 2223 is a communication interface for connecting the base station device 2220 to a core network 2224. The controller 2221 may communicate with a core network node or another eNB via the network interface 2223. In that case, the eNB 2200, and the core network node or the other eNB may be connected to each other via a logical interface (such as an S1 interface and an X2 interface). The network interface 2223 may also be a wired communication interface or a wireless communication interface for radio backhaul. If the network interface 2223 is a wireless communication interface, the network interface 2223 may use a higher frequency band for wireless communication as compared with the frequency band used by the wireless communication interface 2225.

The wireless communication interface 2225 supports any cellular communication scheme (such as Long Term Evolution (LTE) and LTE-advanced), and provides a wireless connection to a terminal located in a cell of the eNB 2200 via the antenna 2210. The wireless communication interface 2225 may generally include a base band (BB) processor 2226 and an RF circuit 2227. The BB processor 2226 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2221, the BB processor 2226 may have a part or all of the above logic functions. The BB processor 2226 may be a memory storing communication control programs or a module including a processor configured to execute programs and a related circuit. Updating programs may change functions of the BB processor 2226. The module may be a card or a blade inserted into a slot of the base station device 2220. Alternatively, the module may be a chip installed on the card or the blade. In addition, the RF circuit 2227 may include, for example, a frequency mixer, a filter or an amplifier, and transmits and receives a wireless signal via the antenna 2210.

As shown in FIG. 22, the wireless communication interface 2225 may include multiple BB processors 2226. For example, the multiple BB processors 2226 may be compatible with the multiple frequency bands used by the eNB 2200. As shown in FIG. 22, the wireless communication interface 2225 may include multiple RF circuits 2227. For example, the multiple RF circuits 2227 may be compatible with multiple antenna elements. Although an example in which the wireless communication interface 2225 includes multiple BB processors 2226 and multiple RF circuits 2227 is shown in FIG. 22, the wireless communication interface 2225 may also include a single BB processor 2226 or a single RF circuit 2227.

SECOND APPLICATION EXAMPLE

Figure 23:
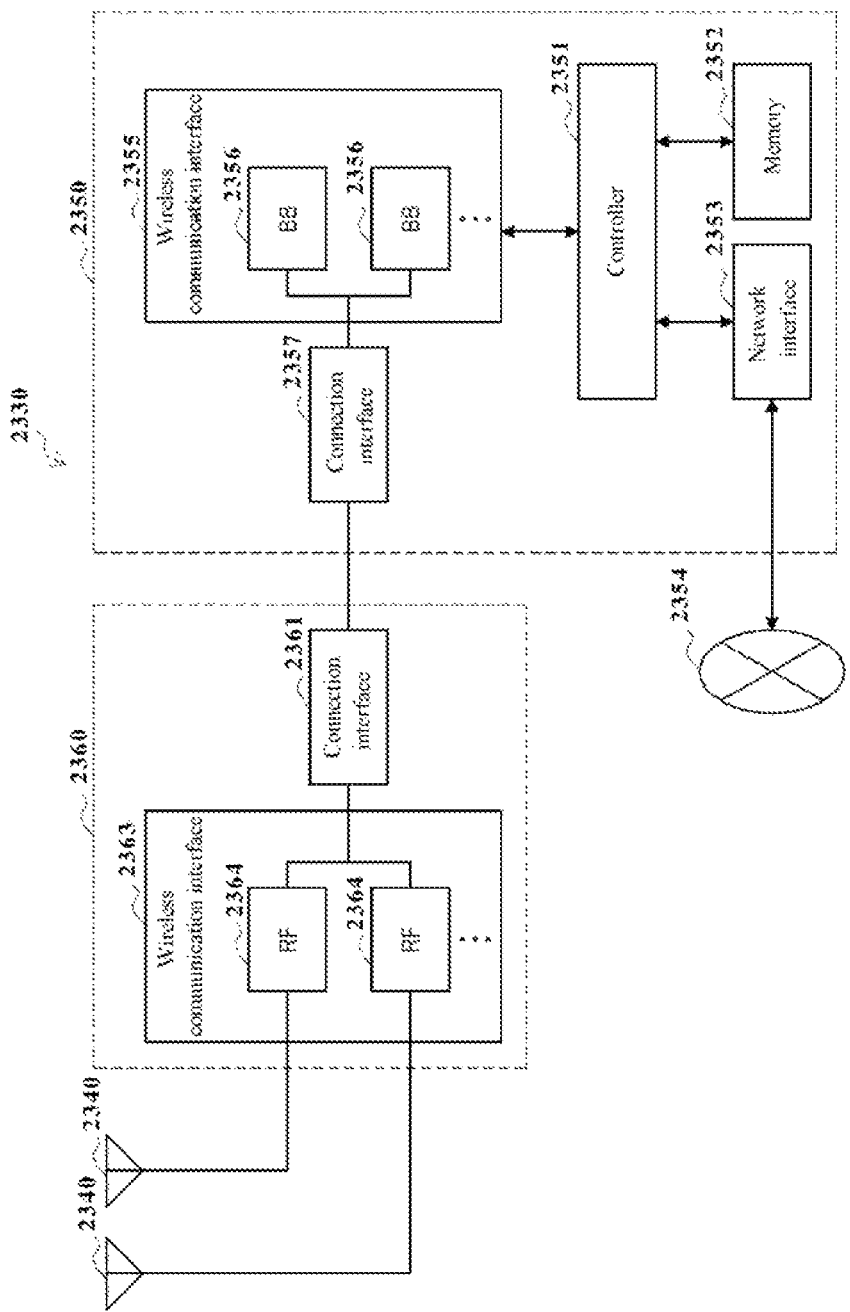
FIG. 23 is a block diagram showing a second example of a schematic configuration of an eNB.

FIG. 23 is a block diagram showing a second example of a schematic configuration of an eNB to which the technology according to the present disclosure may be applied. An eNB 2330 includes one or more antennas 2340, a base station device 2350 and an RRH 2360. Each antenna 2340 and the RRH 2360 may be connected to each other via an RF cable. The base station device 2350 and the RRH 2360 may be connected to each other via a high speed line such as an optical fiber cable.

Each of the antennas 2340 includes a single or multiple antenna elements (such as multiple antenna elements included in an MIMO antenna), and is used to transmit and receive a wireless signal by the RRH 2360. As shown in FIG. 23, the eNB 2330 may include multiple antennas 2340. For example, the multiple antennas 2340 may be compatible with multiple frequency bands used by the eNB 2330. Although an example in which the eNB 2330 includes multiple antennas 2340 is shown in FIG. 23, the eNB 2330 may also include a single antenna 2340.

The base station device 2350 includes a controller 2351, a memory 2352, a network interface 2353, a wireless communication interface 2355, and a connection interface 2357. The controller 2351, the memory 2352 and the network interface 2353 are the same as the controller 2221, the memory 2222 and the network interface 2223 described with reference to FIG. 22.

The wireless communication interface 2355 supports any cellular communication scheme (such as LTE and LTE-Advanced), and provides wireless communication to a terminal positioned in a sector corresponding to the RRH 2360 via the RRH 2360 and the antenna 2340. The wireless communication interface 2355 may generally include, for example, a BB processor 2356. The BB processor 2356 is the same as the BB processor 2226 described with reference to FIG. 22, except the BB processor 2356 is connected to the RF circuit 2364 of the RRH 2360 via the connection interface 2357. As show in FIG. 23, the wireless communication interface 2355 may include multiple BB processors 2356. For example, the multiple BB processors 2356 may be compatible with multiple frequency bands used by the eNB 2330. Although an example in which the wireless communication interface 2355 includes multiple BB processors 2356 is shown in FIG. 23, the wireless communication interface 2355 may also include a single BB processor 2356.

The connection interface 2357 is an interface for connecting the base station device 2350 (the wireless communication interface 2355) to the RRH 2360. The connection interface 2357 may also be a communication module for communication in the above-described high speed line that connects the base station device 2350 (the wireless communication interface 2355) to the RRH 2360.

The RRH 2360 includes a connection interface 2361 and a wireless communication interface 2363.

The connection interface 2361 is an interface for connecting the RRH 2360 (the wireless communication interface 2363) to the base station device 2350. The connection interface 2361 may also be a communication module for the communication in the above high-speed line.

The wireless communication interface 2363 transmits and receives a wireless signal via the antenna 2340. The wireless communication interface 2363 may typically include, for example, the RF circuit 2364. The RF circuit 2364 may include, for example, a frequency mixer, a filter and an amplifier, and transmits and receives a wireless signal via the antenna 2340. The wireless communication interface 2363 may include multiple RF circuits 2364, as shown in FIG. 23. For example, the multiple RF circuits 2364 may support multiple antenna elements. Although an example in which the wireless communication interface 2363 includes the multiple RF circuits 2364 is shown in FIG. 23, the wireless communication interface 2363 may also include a single RF circuit 2364.

In the eNB 2200 shown in FIG. 22 and the eNB 2330 shown in FIG. 23, the processing circuit 410 described with reference to FIG. 4 may be implemented by the controller 2221 and/or the controller 2351. At least a part of the functions may be implemented by the controller 2221 and the controller 2351. For example, the controller 2221 and/or the controller 2351 may perform a function of generating resource indication information and determining information associated with a resource carrying discovery information by executing instructions stored in the corresponding memory.

[Application Example Regarding Terminal Device]

FIRST APPLICATION EXAMPLE

Figure 24:
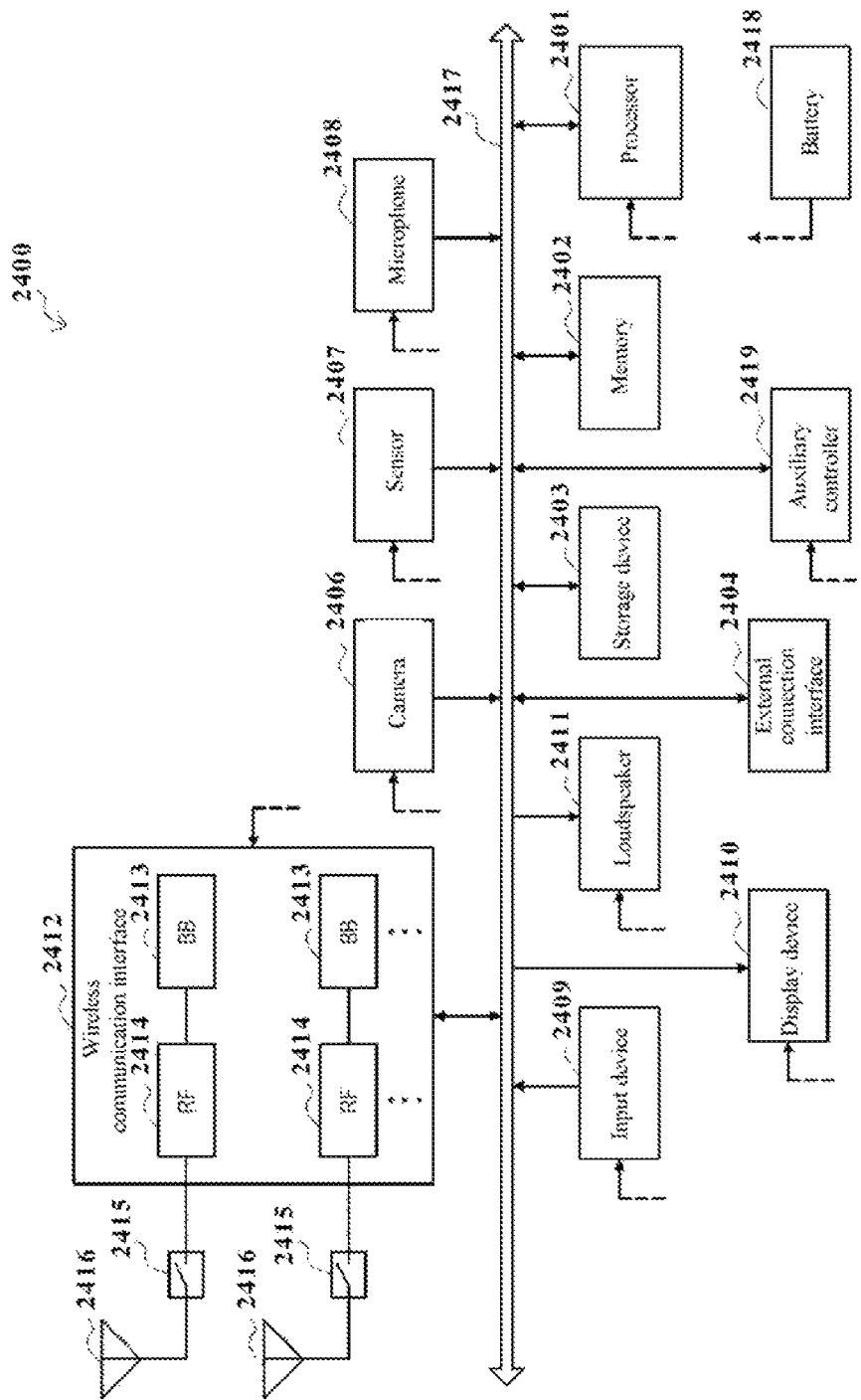
FIG. 24 is a block diagram showing an example of a schematic configuration of a smart phone.

FIG. 24 is a block diagram showing an example of a schematic configuration of a smart phone 2400 to which the technology according to the present disclosure may be applied. The smart phone 2400 includes a processor 2401, a memory 2402, a storage device 2403, an external connection interface 2404, a camera 2406, a sensor 2407, a microphone 2408, an input device 2409, a display device 2410, a speaker 2411, a wireless communication interface 2412, one or more antenna switches 2415, one or more antennas 2416, a bus 2417, a battery 2418, and an auxiliary controller 2419.

The processor 2401 may be, for example, a CPU or a system on a chip (SoC), and controls functions of an application layer and another layer of the smart phone 2400. The memory 2402 includes an RAM and an ROM, and stores a program that is executed by the processor 2401, and data. The storage device 2403 may include a storage medium such as a semiconductor memory and a hard disk. The external connection interface 2404 is an interface for connecting an external device (such as a memory card and a universal serial bus (USB) device) to the smart phone 2400.

The camera 2406 includes an image sensor (such as a charge coupled device (CCD) and a complementary metal oxide semiconductor (CMOS)), and generates a captured image. The sensor 2407 may include a group of sensors such as a measurement sensor, a gyro sensor, a geomagnetic sensor, and an acceleration sensor. The microphone 2408 converts sounds that are inputted to the smart phone 2400 into audio signals. The input device 2409 includes, for example, a touch sensor configured to detect touch onto a screen of the display device 2410, a keypad, a keyboard, a button, or a switch, and receive an operation or information inputted from a user. The display device 2410 includes a screen (such as a liquid crystal display (LCD) and an organic light-emitting diode (OLED) display), and displays an output image of the smart phone 2400. The speaker 2411 converts audio signals that are outputted from the smartphone 2400 to sounds.

The wireless communication interface 2412 supports any cellular communication scheme (such as LET and LTE-Advanced), and performs wireless communication. The wireless communication interface 1212 may include, for example, a BB processor 2413 and an RF circuit 2414. The BB processor 2413 may perform, for example, coding/decoding, modulation/demodulation and multiplexing/demultiplexing, and perform various types of signal processes for wireless communication. The RF circuit 2414 may include, for example, a frequency mixer, a filter and an amplifier, and transmits and receives a wireless signal via the antenna 2416. The wireless communication interface 2412 may be a chip module having the BB processor 2413 and the RF circuit 2414 integrated thereon. The wireless communication interface 2412 may include multiple BB processors 2413 and multiple RF circuits 2414, as shown in FIG. 24. Although an example in which the wireless communication interface 2412 includes the multiple BB processors 2413 and the multiple RF circuits 2414 is shown in FIG. 24, the wireless communication interface 2412 may also include a single BB processor 2413 or a single RF circuit 2414.

Further, in addition to the cellular communication scheme, the wireless communication interface 2412 may support another type of wireless communication scheme, such as short-range wireless communication scheme, a near field communication scheme and a wireless local area network (LAN) scheme. In that case, the wireless communication interface 2412 may include the BB processor 2413 and the RF circuit 2414 for each wireless communication scheme.

Each of the antenna switches 2415 switches connection destinations of the antennas 2416 among multiple circuits (such as circuits for different wireless communication schemes) included in the wireless communication interface 2412.

Each of the antennas 2416 includes a single or multiple antenna elements (such as multiple antenna elements included in an MIMO antenna), and is used to transmit and receive a wireless signal by the wireless communication interface 2412. The smartphone 2400 may include the multiple antennas 2416, as shown in FIG. 24. Although an example in which the smart phone 2400 includes the multiple antennas 2416 is shown in FIG. 24, the smart phone 2400 may also include a single antenna 2416.

Furthermore, the smart phone 2400 may include the antenna 2416 for each wireless communication scheme. In this case, the antenna switches 2415 may be omitted from the configuration of the smart phone 2400.

The bus 2417 connects the processor 2401, the memory 2402, the storage device 2403, the external connection interface 2404, the camera 2406, the sensor 2407, the microphone 2408, the input device 2409, the display device 2410, the speaker 2411, the wireless communication interface 2412, and the auxiliary controller 2419 to each other. The battery 2418 supplies power to the modules of the smartphone 2400 shown in FIG. 24 via a feeder line. The feeder line is partially shown with a dash line in FIG. 24. The auxiliary controller 2419, for example, operates a minimum necessary function of the smart phone 2400, for example, in a sleep mode.

In the smart phone 2400 shown in FIG. 24, the processing circuit 210 described with reference to FIG. 2 and the processing circuit 310 described with reference to FIG. 3 may be implemented by the processor 2401 or the auxiliary controller 2419. At least a part of the functions may be implemented by the processor 2401 and the auxiliary controller 2419. For example, the processor 2401 or the auxiliary controller 2419 may perform a function of generating resource indication information and determining information associated with a resource carrying discovery information by executing instructions stored in the memory 2402 or the storage device 2403.

SECOND APPLICATION EXAMPLE

Figure 25:
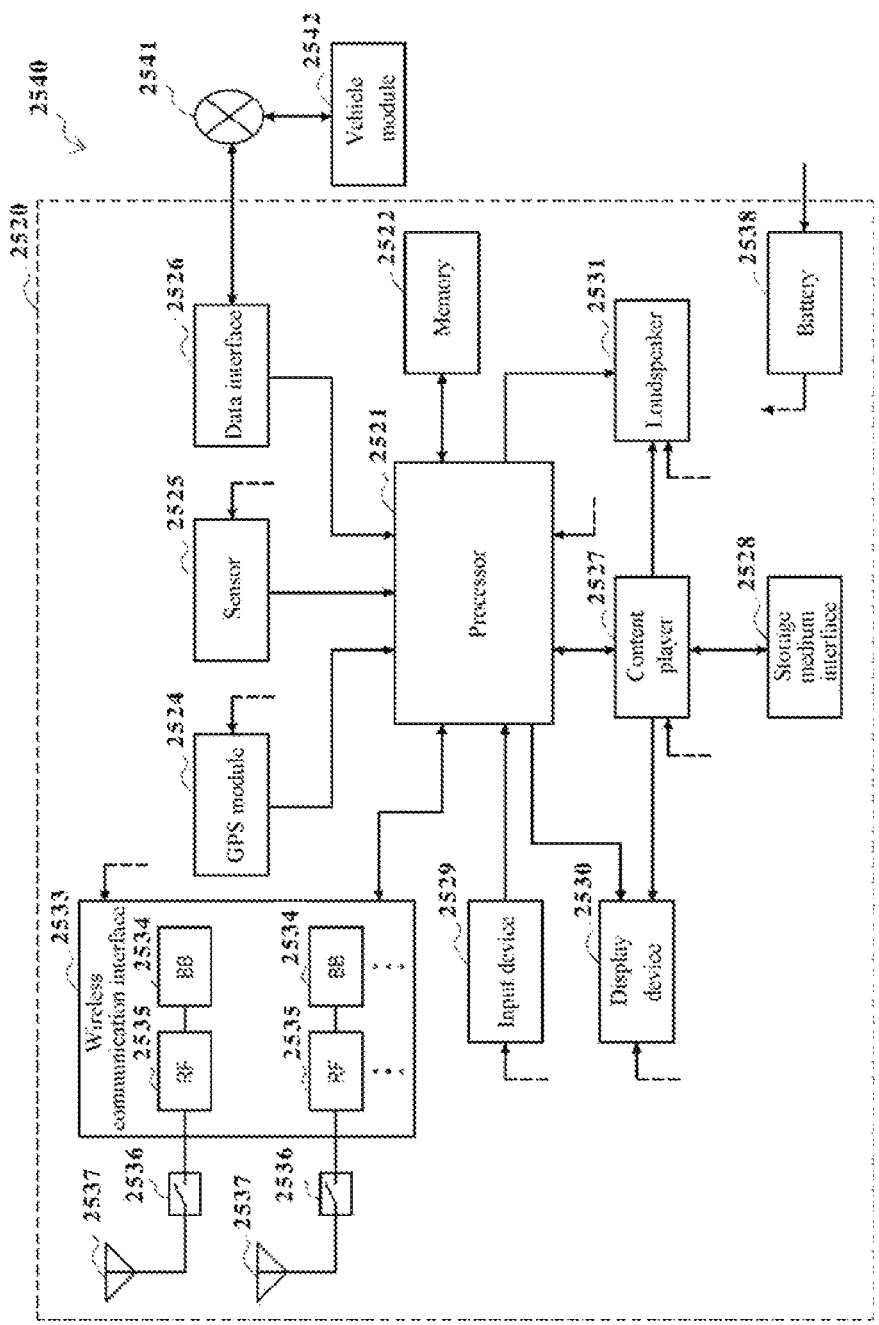
FIG. 25 is a block diagram showing an example of a schematic configuration of a car navigation device.

FIG. 25 is a block diagram showing an example of a schematic configuration of a car navigation device 2520 to which the technology according to the present disclosure may be applied. The car navigation device 2520 includes a processor 2521, a memory 2522, a global positioning system (GPS) module 2524, a sensor 2525, a data interface 2526, a content player 2527, a storage medium interface 2528, an input device 2529, a display device 2530, a speaker 2531, a wireless communication interface 2533, one or more antenna switches 2536, one or more antennas 2537, and a battery 2538.

The processor 2521 may be, for example, a CPU or a SoC, and control the navigation function and another function of the car navigation device 2520. The memory 2522 includes a RAM and a ROM, and stores the data and the program to be performed by the processor 2521.

The GPS module 2524 measures the position (such as latitude, longitude and height) of the car navigation device 2520 using the GPS signal received from the GPS satellite. The sensor 2525 may include a group of sensors, such as a gyro sensor, a geomagnetic sensor and an air pressure sensor. The data interface 2526 is connected to, for example, an in-vehicle network 2541 via a terminal that is not shown, and acquires data generated by the vehicle (such as vehicle speed data).

The content player 2527 reproduces content stored in a storage medium (such as a CD and a DVD) that is inserted into the storage medium interface 2528. The input device 2529 includes, for example, a touch sensor configured to detect touch on a screen of the display device 2530, a button, or a switch, and receives an operation or information inputted from a user. The display device 2530 includes a screen such as a LCD or an OLED display, and displays an image of the navigation function or content that is reproduced. The speaker 2531 outputs sounds of the navigation function or the content that is reproduced.

The wireless communication interface 2533 supports any cellular communication scheme (such as LTE and LTE-advanced) and performs wireless communication. The wireless communication interface 2533 may typically include, for example, a BB processor 2534 and an RF circuit 2535. The BB processor 2534 may perform, for example, encoding/decoding, modulating/demodulating, and multiplexing/demultiplexing, and performs various types of signal processing for wireless communication. The RF circuit 2535 may include, for example, a frequency mixer, a filter and an amplifier, and transmits and receives a wireless signal via the antenna 2537. The wireless communication interface 2533 may also be a chip module that has the BB processor 2534 and the RF circuit 2535 integrated thereon. The wireless communication interface 2533 may include multiple BB processors 2534 and multiple RF circuits 2535, as shown in FIG. 25. Although an example in which the wireless communication interface 2533 includes the multiple BB processors 2534 and the multiple RF circuits 2535 is shown in FIG. 25, the wireless communication interface 2533 may also include a single BB processor 2534 or a single RF circuit 2535.

Furthermore, in addition to a cellular communication scheme, the wireless communication interface 2533 may support another type of wireless communication scheme such as a short-distance wireless communication scheme, a near field communication scheme, and a wireless LAN scheme. In that case, the wireless communication interface 2533 may include the BB processor 2534 and the RF circuit 2535 for each wireless communication scheme.

Each of the antennas switches 2536 switches a connection destination of the antenna 2537 among multiple circuits included in the wireless communication interface 2533 (such as circuits for different wireless communication schemes).

Each of the antennas 2537 includes a single or multiple antenna elements (such as multiple antenna elements included in a MIMO antenna) and is used to transmit and receive a wireless signal by the wireless communication interface 2533. The car navigation device 2520 may include multiple antennas 2537, as shown in FIG. 25. Although an example in which the car navigation device 2520 includes the multiple antennas 2537 is shown in FIG. 25, the car navigation device 2520 may also include a single antenna 2537.

Furthermore, the car navigation device 2520 may include the antenna 2537 for each wireless communication scheme. In this case, the antenna switch 2536 may be omitted from the configuration of the vehicle navigation device 2520.

The battery 2538 supplies power to blocks of the car navigation device 2520 as shown in FIG. 25 via a feeder line. The feeder line is partially shown as a dashed line in FIG. 25. The battery 2538 accumulates power provided by the vehicle.

In the car navigation device 2520 shown in FIG. 25, the processing circuit 210 described with reference to FIG. 2 and the processing circuit 310 described with reference to FIG. 3 may be implemented by the processor 2521. At least a part of the functions may be implemented by the processor 2521. For example, the processor 2521 may perform a function of generating resource indication information and determining information associated with a resource carrying discovery information by executing instructions stored in the memory 2522.

The technology of the present disclosure may also be implemented as an in-vehicle system (or a vehicle) 2540 including one or more of the car navigation device 2520, an in-vehicle network 2541 and a vehicle module 2542. The vehicle module 2542 generates vehicle data (such as a vehicle speed, an engine speed, and fault information), and outputs the generated data to the in-vehicle network 2541.

In the system and the method of the present disclosure, it is apparent that each unit or step can be decomposed and/or recombined. These decomposition and/or recombination shall be considered as equivalents of the present disclosure. Also, the steps of executing the above described series of processes can be naturally performed in chronological order in the described order, but need not necessarily be performed in chronological order. Certain steps may be performed in parallel or independently of one another.

In addition, according to the present disclosure, the following configuration can be performed.

(1). An electronic device in a wireless communication system, including:

a processing circuit configured to generate resource indication information for indicating a resource carrying discovery information; and a transceiver circuit configured to transmit the resource indication information.

(2). The electronic device according to item (1), where the electronic device is a terminal device serving as a relay device, and the resource indication information is used to indicate a resource for the electronic device transmitting the discovery information.

(3). The electronic device according to item (2), where the transceiver circuit is configured to transmit the resource indication information periodically to a network side device for serving the electronic device.

(4). The electronic device according to item (2), where the transceiver circuit is configured to transmit the resource indication information to a terminal device serving as a remote device.

(5). The electronic device according to item (4), where the transceiver circuit is configured to transmit the resource indication information to the remote device through a synchronization message.

(6). The electronic device according to item (4), where the transceiver circuit is configured to transmit the resource indication information to the remote device through a discovery announcement message.

(7). The electronic device according to item (2), where the transceiver circuit is configured to receive a discovery response message from another relay device other than the electronic device, and the discovery response message includes identification information of a remote device performing device-to-device (D2D) communication with the electronic device.

(8). The electronic device according to item (7), where the discovery response message further includes discovery reference signal received power (RSRP) information regarding the remote device measured by the another relay device.

(9). The electronic device according to item (7), where the transceiver circuit is configured to transmit the discovery response message to the remote device.

(10). The electronic device according to item (7), where the transceiver circuit is configured to transmit the discovery response message to a network side device for serving the electronic device.

(11). The electronic device according to item (1), where the electronic device is a terminal device serving as a relay device, and the resource indication information is used to indicate a priority of each resource carrying discovery information in a resource pool.

(12). The electronic device according to item (11), where the transceiver circuit is configured to transmit the resource indication information periodically to a remote device performing a device-to-device (D2D) communication with the electronic device.

(13). The electronic device according to item (1), where the electronic device is a terminal device serving as a remote device, and the resource indication information is used to indicate a resource for the remote device receiving the discovery information.

(14). The electronic device according to item (13), where the transceiver circuit is configured to transmit the resource indication information periodically to a network side device for serving the electronic device.

(15). The electronic device according to item (13), where the transceiver circuit is configured to transmit the resource indication information to a terminal device serving as a relay device.

(16). The electronic device according to item (15), where the transceiver circuit is configured to transmit the resource indication information to the relay device through a synchronization message.

(17). The electronic device according to item (15), where the transceiver circuit is configured to transmit the resource indication information to the relay device through a discovery request message.

(18). The electronic device according to item (17), where the resource indication information is further used to indicate a relationship between the resource for the remote device receiving the discovery information and discovery reference signal received power (RSRP) information regarding the remote device measured by the relay device.

(19). The electronic device according to item (13), where the transceiver circuit is configured to broadcast and transmit a discovery request message, and the discovery request message includes information for indicating transmission of a discovery response message corresponding to the discovery request message to a relay device performing device-to-device (D2D) communication with the electronic device.

(20). The electronic device according to item (1), where the electronic device is a network side device, and the resource indication information is used to indicate a relationship between each resource carrying discovery information in a resource pool and a position of a terminal device for transmitting or receiving the discovery information.

(21). The electronic device according to any one of items (1) to (20), where the resource indication information further indicates a narrow-band resource.

(22). An electronic device in a wireless communication system, including:

a transceiver circuit configured to receive resource indication information for indicating a resource carrying discovery information; and a processing circuit configured to determine, according to the resource indication information, information associated with the resource carrying discovery information.

(23). The electronic device according to item (22), where the electronic device is a network side device, the transceiver circuit is configured to receive, from a terminal device serving as a relay device within a coverage of the electronic device, resource indication information for indicating a resource for the relay device transmitting the discovery information, or receive, from a terminal device serving as a remote device within a coverage of the electronic device, resource indication information for indicating a resource for the remote device receiving the discovery information.

(24). The electronic device according to item (23), where the processing circuit is configured to determine, according to the resource indication information, a priory of each resource carrying discovery information in a resource pool.

(25). The electronic device according to item (22), where the electronic device is a terminal device serving as a relay device.

(26). The electronic device according to item (25), where the transceiver circuit is configured to receive the resource indication information from a network side device for serving the electronic device, and the resource indication information is used to indicate a relationship between each resource carrying discovery information and a position of the electronic device.

(27). The electronic device according to item (26), where the processing circuit is configured to determine a resource for the electronic device transmitting the discovery information according to the position of the electronic device, a range of device-to-device (D2D) communication of the electronic device, and the resource indication information.

(28). The electronic device according to item (25), where the transceiver circuit is configured to receive the resource indication information from a terminal device serving as a remote device, and the resource indication information is used to indicate a resource for the remote device receiving the discovery information.

(29). The electronic device according to item (28), where the processing circuit is configured to determine, according to the resource indication information, a resource for the electronic device transmitting the discovery information.

(30). The electronic device according to item (28), where the transceiver circuit is configured to receive the resource indication information through a synchronization message.

(31). The electronic device according to item (28), where the transceiver circuit is configured to receive the resource indication information through a discovery request message.

(32). The electronic device according to item (31), where the resource indication information is further used to indicate a relationship between the resource for the remote device receiving the discovery information and discovery reference signal received power (RSRP) information regarding the remote device measured by the relay device.

(33). The electronic device according to item (22), where the electronic device is a terminal device serving as a remote device.

(34). The electronic device according to item (33), where the transceiver circuit is configured to receive the resource indication information from a network side device for serving the electronic device, and the resource indication information is used to indicate a relationship between each resource carrying discovery information in a resource pool and a position of the electronic device.

(35). The electronic device according to item (34), where the processing circuit is configured to determine a resource for the electronic device receiving the discovery information according to the position of the electronic device and the resource indication information.

(36). The electronic device according to item (33), where the transceiver circuit is configured to receive the resource indication information from a terminal device serving as a relay device, and the resource indication information is used to indicate a resource for the relay device transmitting the discovery information.

(37). The electronic device according to item (36), where the processing circuit is configured to determine, according to the resource indication information, a resource for the electronic device receiving the discovery information.

(38). The electronic device according to item (36), where the transceiver circuit is configured to receive the resource indication information through a synchronization message.

(39). The electronic device according to item (36), where the transceiver circuit is configured to receive the resource indication information through a discovery announcement message.

(40). The electronic device according to item (33), where the transceiver circuit is configured to receive the resource indication information from a relay device performing device-to-device (D2D) communication with the electronic device, and the resource indication information is used to indicate a priority of each resource carrying discovery information in a resource pool.

(41). The electronic device according to item (40), where the processing circuit is configured to determine, according to the resource indication information, a resource for the electronic device receiving the discovery information.

(42). A wireless communication method performed by an electronic device in a wireless communication system, including:
generating resource indication information for indicating a resource carrying discovery information; and
transmitting the resource indication information.

(43). A wireless communication method performed by an electronic device in a wireless communication system, including:
receiving resource indication information for indicating a resource carrying discovery information; and
determining, according to the resource indication information, information associated with the resource carrying discovery information.

(44). An electronic device in a wireless communication system, including:
a transceiver circuit configured to transmit, to a relay device and a remote device within a service range of the electronic device, information regarding groups divided based on history information of a connection relation between the relay device and the remote device, and receive, from the relay device or the remote device within the service range of the electronic device, request information of a group-based discovery process; and
a processing circuit configured to determine whether the relay device or the remote device is capable of performing the group-based discovery process.

(45). A computer-readable storage medium, including computer-executable instructions, which when executed by an information processing device, cause the information processing device to execute the method according to item (42) or (43).

The embodiments of the present disclosure are described in detail above with reference to the drawings. However, it should be understood that the above-described embodiments are merely illustrative rather than limiting of the present disclosure. Those skilled in the art can make various modifications and changes to the above-described embodiments without departing from the spirit and scope of the present disclosure. Therefore, the scope of the present disclosure is limited only by the appended claims and their equivalents.

The invention claimed is:

1. An electronic device in a wireless communication system, comprising circuitry configured to: generate resource indication information for indicating a resource carrying discovery information; transmit the resource indication information; receive priority information of each resource carrying discovery information in a resource pool in response to the transmission of the resource indication information; receive a discovery response message from another relay device other than the electronic device, the discovery response message comprising identification information of a remote device performing device-to-device (D2D) communication with the electronic device and discovery reference signal received power (RSRP) information regarding the remote device measured by the another relay device; and transmit the discovery response message to the remote device and a network side device for serving the electronic device.

2. The electronic device according to claim 1, wherein the electronic device is a terminal device serving as a relay device, and the resource indication information is used to indicate a resource for the electronic device transmitting the discovery information.

3. The electronic device according to claim 2, wherein the circuitry is further configured to:
transmit the resource indication information to a terminal device serving as a remote device; and
transmit the resource indication information to the remote device through a synchronization message or a discovery announcement message.

4. The electronic device according to claim 1, wherein the electronic device is a terminal device serving as a relay device, and the resource indication information is used to indicate a priority of each resource carrying discovery information in a resource pool.

5. The electronic device according to claim 1, wherein the electronic device is a terminal device serving as a remote device, and the resource indication information is used to indicate a resource for the remote device receiving the discovery information.

6. The electronic device according to claim 5, wherein the circuitry is further configured to: transmit the resource indication information to a terminal device serving as a relay device; and transmit the resource indication information to the relay device through a synchronization message or a discovery request message.

7. The electronic device according to claim 6, wherein the resource indication information is further used to indicate a relationship between the resource for the remote device receiving the discovery information and discovery reference signal received power (RSRP) information regarding the remote device measured by the relay device.

8. The electronic device according to claim 1, wherein the electronic device is a network side device, and the resource indication information is used to indicate a relationship between each resource carrying discovery information in a resource pool and a position of a terminal device for transmitting or receiving the discovery information.

9. An electronic device in a wireless communication system comprising circuitry configured to: receive resource indication information for indicating a resource carrying discovery information from at least one device; determine, according to the resource indication information, priority information associated with the resource carrying discovery information received from each of the at least one device; and transmit priority information of each resource carrying discovery information in a resource pool in response to the receiving the resource indication information wherein the electronic device is a network side device, the circuitry is further configured to receive, from a terminal device serving as a relay device within a coverage of the electronic device, resource indication information for indicating a resource for the relay device transmitting the discovery information, or receive, from a terminal device serving as a remote device within a coverage of the electronic device, resource indication information for indicating a resource for the remote device receiving the discovery information, and wherein the processing circuit is configured to determine, according to the resource indication information, a priority of each resource carrying discovery information in a resource pool.

10. The electronic device according to claim 9, wherein the electronic device is a terminal device serving as a relay device.

11. The electronic device according to claim 10, wherein the transceiver circuit is configured to receive the resource indication information from a network side device for serving the electronic device, and the resource indication information is used to indicate a relationship between each resource carrying discovery information and a position of the electronic device, and
wherein the processing circuit is configured to determine a resource for the electronic device transmitting the discovery information according to the position of the electronic device, a range of device-to-device (D2D) communication of the electronic device, and the resource indication information.

12. The electronic device according to claim 10, wherein the transceiver circuit is configured to receive the resource indication information from a terminal device serving as a remote device, and the resource indication information is used to indicate a resource for the remote device receiving the discovery information,
wherein the processing circuit is configured to determine, according to the resource indication information, a resource for the electronic device transmitting the discovery information, and
wherein the transceiver circuit is configured to receive the resource indication information through a synchronization message or a discovery request message.

13. The electronic device according to claim 12, wherein the resource indication information is further used to indicate a relationship between the resource for the remote device receiving the discovery information and discovery reference signal received power (RSRP) information regarding the remote device measured by the relay device.

14. The electronic device according to claim 9, wherein the electronic device is a terminal device serving as a remote device.

15. The electronic device according to claim 14, wherein the transceiver circuit is configured to receive the resource indication information from a network side device for serving the electronic device, and the resource indication information is used to indicate a relationship between each resource carrying discovery information in a resource pool and a position of the electronic device, and
wherein the processing circuit is configured to determine a resource for the electronic device receiving the discovery information according to the position of the electronic device and the resource indication information.

16. The electronic device according to claim 14, wherein the transceiver circuit is configured to receive the resource indication information from a terminal device serving as a relay device, and the resource indication information is used to indicate a resource for the relay device transmitting the discovery information,
wherein the processing circuit is configured to determine, according to the resource indication information, a resource for the electronic device receiving the discovery information, and
wherein the transceiver circuit is configured to receive the resource indication information through a synchronization message or a discovery announcement message.

17. The electronic device according to claim 14, wherein the transceiver circuit is configured to receive the resource indication information from a relay device performing device-to-device (D2D) communication with the electronic device, and the resource indication information is used to indicate a priority of each resource carrying discovery information in a resource pool, and
wherein the processing circuit is configured to determine, according to the resource indication information, a resource for the electronic device receiving the discovery information.

18. A wireless communication method performed by an electronic device in a wireless communication system, comprising: generating resource indication information for indicating a resource carrying discovery information; transmitting the resource indication information; receiving priority information of each resource carrying discovery information in a resource pool in response to the transmission of the resource indication information receiving a discovery response message from another relay device other than the electronic device, the discovery response message comprising identification information of a remote device performing device-to-device (D2D) communication with the electronic device and discovery reference signal received power (RSRP) information regarding the remote device measured by the another relay device; and transmitting the discovery response message to the remote device and a network side device for serving the electronic device.

* * * * *